United States Patent
Bencze

(10) Patent No.: US 12,228,171 B2
(45) Date of Patent: Feb. 18, 2025

(54) ESP MOTOR RADIAL BEARING ANTI-ROTATION TAB RETENTION

(71) Applicant: Halliburton Energy Services, Inc., Houston, TX (US)

(72) Inventor: András Bencze, Frimley (GB)

(73) Assignee: Halliburton Energy Services, Inc., Houston, TX (US)

(*) Notice: Subject to any disclaimer, the term of this patent is extended or adjusted under 35 U.S.C. 154(b) by 110 days.

(21) Appl. No.: 18/202,123

(22) Filed: May 25, 2023

(65) Prior Publication Data
US 2024/0392830 A1 Nov. 28, 2024

(51) Int. Cl.
| | |
|---|---|
| F16C 27/02 | (2006.01) |
| F04D 29/046 | (2006.01) |
| F16C 17/02 | (2006.01) |
| F16C 35/02 | (2006.01) |
| H02K 5/132 | (2006.01) |
| H02K 5/167 | (2006.01) |
| E21B 43/12 | (2006.01) |

(52) U.S. Cl.
CPC .......... *F16C 17/02* (2013.01); *F04D 29/0465* (2013.01); *F16C 27/02* (2013.01); *F16C 35/02* (2013.01); *H02K 5/132* (2013.01); *H02K 5/167* (2013.01); *E21B 43/128* (2013.01); *F16C 2226/14* (2013.01); *F16C 2360/44* (2013.01); *F16C 2380/26* (2013.01)

(58) Field of Classification Search
CPC .......... F16C 17/02; F16C 27/02; F16C 35/02; F16C 2226/14; F16C 2360/44; F16C 2380/26; E21B 43/128; F04B 29/0465; H02K 5/132; H02K 5/167
See application file for complete search history.

(56) References Cited

U.S. PATENT DOCUMENTS

| | | | |
|---|---|---|---|
| 4,521,708 A * | 6/1985 | Vandevier | H02K 5/167 310/90 |
| 7,808,140 B2 | 10/2010 | Cain et al. | |
| 7,836,947 B2 | 11/2010 | Booth | |
| 9,951,810 B2 | 4/2018 | Parmeter et al. | |
| 11,441,601 B1 | 9/2022 | Obeid et al. | |
| 2016/0053807 A1* | 2/2016 | Maciver | F16C 27/02 384/473 |
| 2019/0123609 A1* | 4/2019 | Wilcox | F04D 13/08 |

FOREIGN PATENT DOCUMENTS

| | | | | |
|---|---|---|---|---|
| WO | WO-2015134236 A1 * | 9/2015 | | F16C 35/02 |
| WO | 2022212660 A1 | 10/2022 | | |

OTHER PUBLICATIONS

Foreign Communication from Related Application—International Search Report and Written Opinion of the International Searching Authority, International Application No. PCT/US2023/023913, dated Feb. 16, 2024, 12 pages.

* cited by examiner

*Primary Examiner* — Phillip A Johnson
(74) *Attorney, Agent, or Firm* — Conley Rose, P.C.; Rodney B. Carroll

(57) ABSTRACT

Rotor bearings for ESP motors can include anti-rotation tabs configured to engage with a stator during assembly of the ESP motor. Prior to insertion of the rotor bearing within the stator, the anti-rotation tabs may be held in place within axial slots in the outer surface of a bearing bushing of the rotor bearing using retention rings. The retention rings and the bearing bushing may be configured to allow for interference fit.

20 Claims, 16 Drawing Sheets

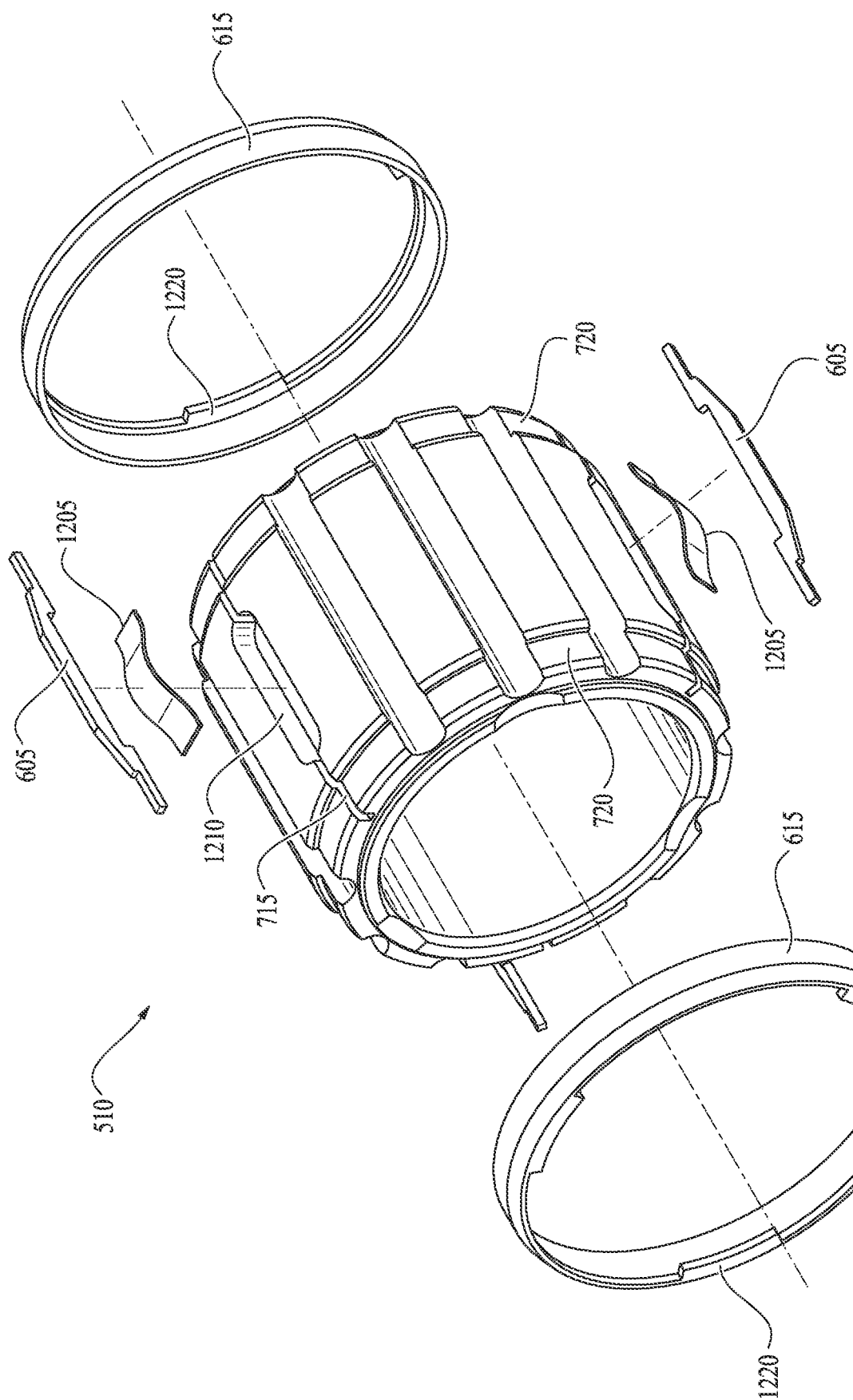

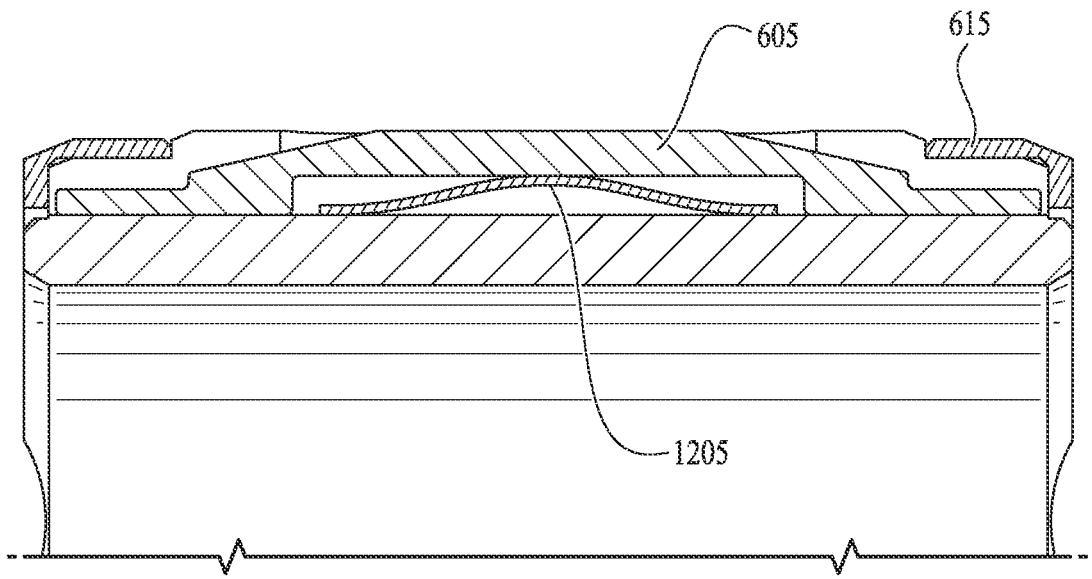
_fig.13_
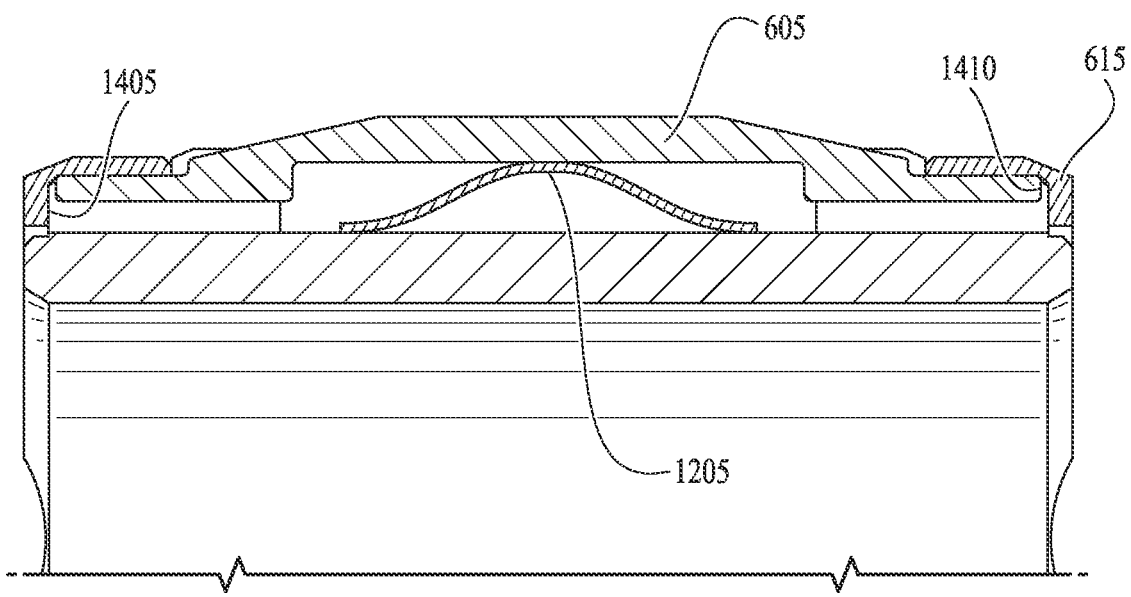
_fig.14_

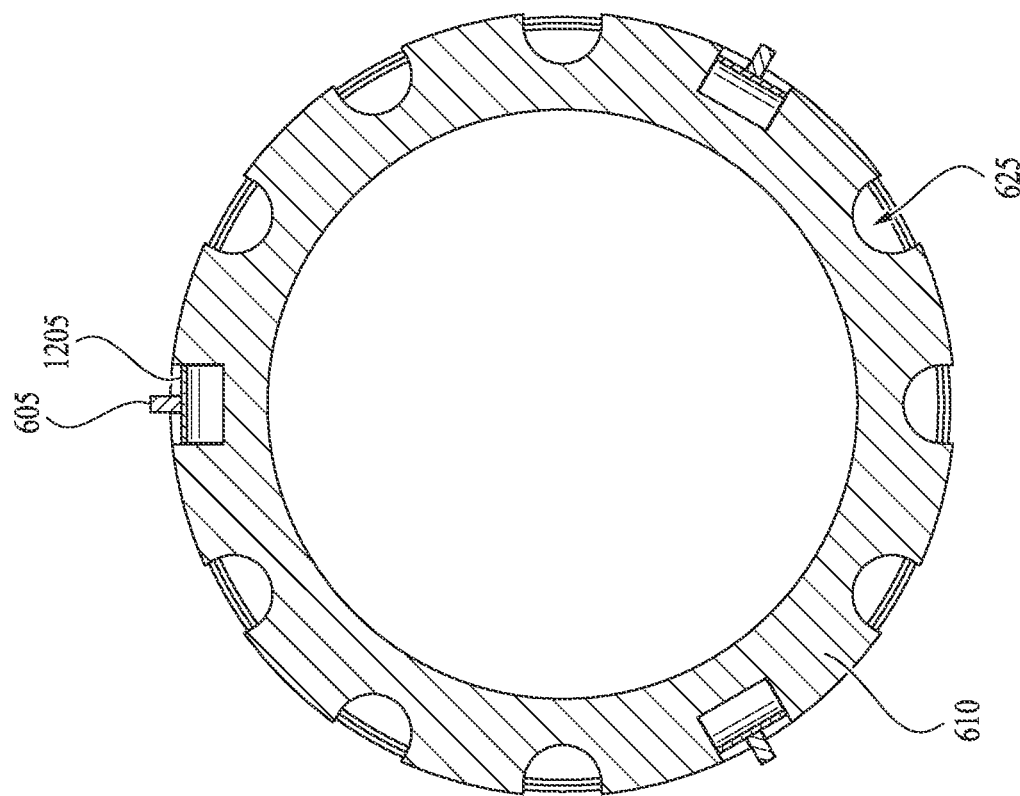
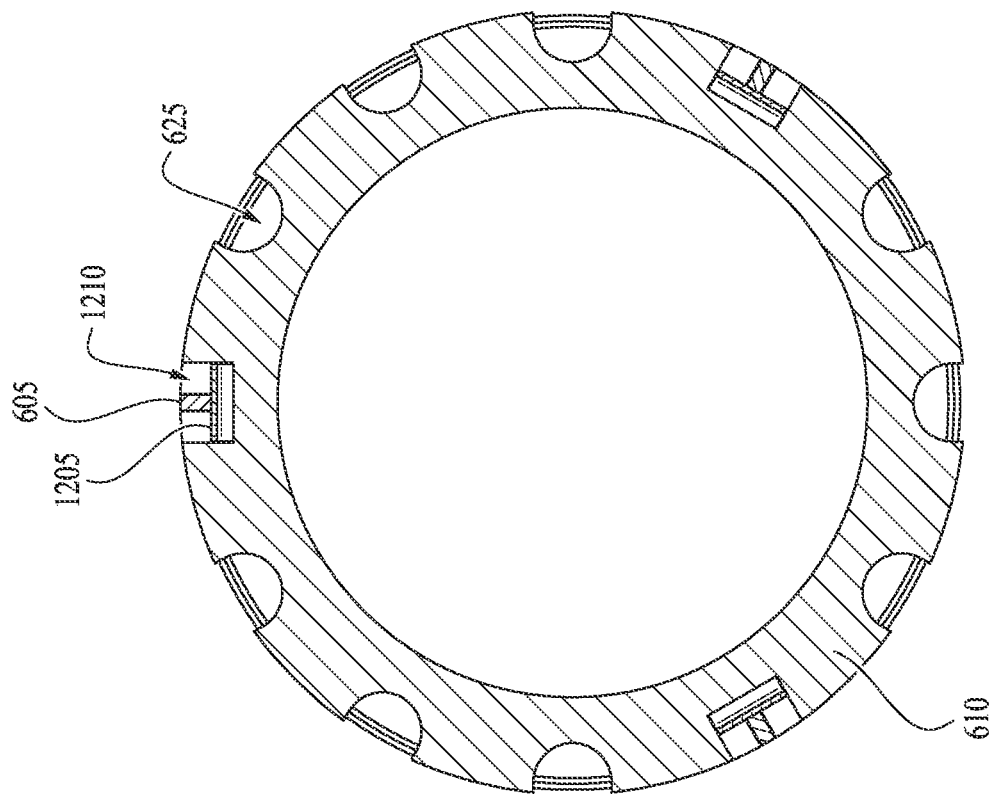

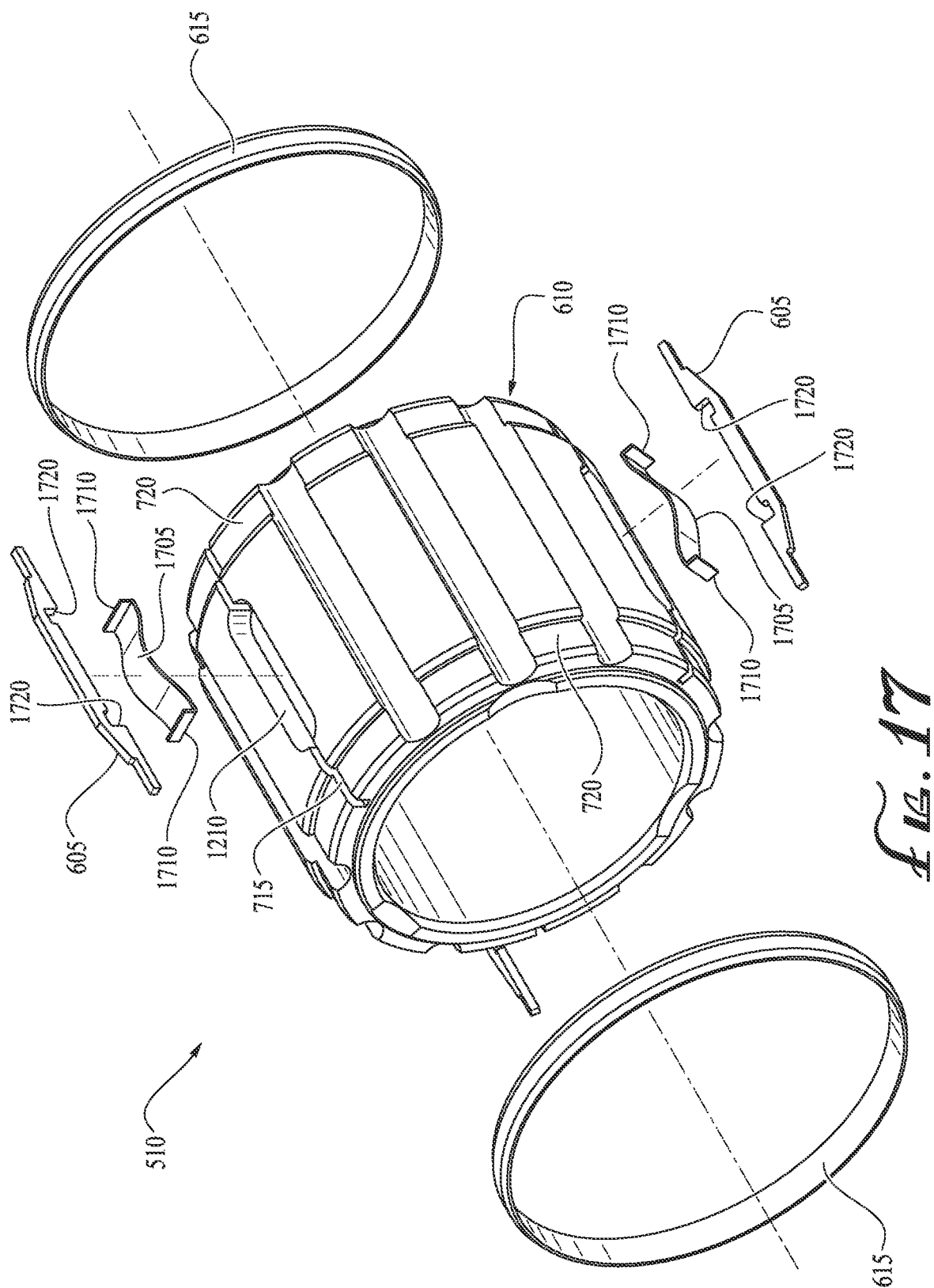

ESP MOTOR RADIAL BEARING ANTI-ROTATION TAB RETENTION

CROSS-REFERENCE TO RELATED APPLICATIONS

None.

STATEMENT REGARDING FEDERALLY SPONSORED RESEARCH OR DEVELOPMENT

Not applicable.

FIELD

This disclosure relates generally to the field of pumping. More particularly, this disclosure relates to the field of electric submersible pumps for use downhole in a well. Still more particularly, this disclosure relates to downhole motors of the sort which may be used in electric submersible pumps, and to rotor bearing improvements for such downhole motors.

BACKGROUND

Electric submersible pump (ESP) assemblies are used to artificially lift fluid to the surface, for example in deep wells such as oil or water wells. ESP assemblies are commonly used in the oil and gas industry to extract fluids from underground reservoirs. By way of example, the artificial lift provided by ESP assemblies may be useful in situations when the reservoir does not have sufficient energy to allow the well to naturally produce effectively, or when an additional boost to production of the well is desired. Improvements to ESP assemblies can improve overall production of fluids from a well, which may thereby improve the profitability of the well. Improvements in the construction and assembly of the ESP and/or its component parts may result in lower ESP costs and/or in improved characteristics (such as durability or life).

A typical ESP assembly comprises, from bottom to top, an electric motor, a seal unit, a pump intake, and a pump (e.g. typically a centrifugal pump), which are all mechanically connected together with shafts and shaft couplings. The electric motor supplies torque to the shafts, which provides power to the centrifugal pump. The electric motor is isolated from a wellbore environment by a housing and by the seal unit. The seal unit can act as an oil reservoir for the electric motor. The oil can function both as a dielectric fluid and as a lubricant in the electric motor. The seal unit also may provide pressure equalization between the electric motor and the wellbore environment.

The centrifugal pump is configured to transform mechanical torque received from the electric motor via a drive shaft to fluid pressure which can lift fluid up the wellbore. For example, the centrifugal pump typically has rotatable impellers within stationary diffusers. A shaft extending through the centrifugal pump is operatively coupled to the motor, and the impellers of the centrifugal pump are rotationally coupled to the shaft. In use, the motor can rotate the shaft, which in turn can rotate the impellers of the centrifugal pump relative to and within the stationary diffusers, thereby imparting pressure to the fluid within the centrifugal pump. The electric motor is generally connected to a power source located at the surface of the well using a cable and a motor lead extension. The ESP assembly is placed into the well and usually is inside a well casing. In a cased completion, the well casing separates the ESP assembly from the surrounding formation. In operation, perforations in the well casing allow well fluid to enter the well casing and flow to the pump intake for transport to the surface.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 12 is an exploded isometric view of an alternate bearing bushing assembly embodiment, according to an embodiment of the disclosure;

FIG. 13 is an axial cross-section view of the bearing bushing assembly of FIG. 12, with the anti-rotation tab compressed, according to an embodiment of the disclosure;

FIG. 14 is an axial cross-section view of the bearing bushing assembly of FIG. 12, with the anti-rotation tab extended, according to an embodiment of the disclosure;

FIG. 15 is a radial cross-section view of the bearing bushing assembly of FIG. 13, according to an embodiment of the disclosure;

FIG. 16 is a radial cross-section view of the bearing bushing assembly of FIG. 14, according to an embodiment of the disclosure;

FIG. 17 is an isometric exploded view of another alternate bearing bushing assembly embodiment, according to an embodiment of the disclosure;

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms "upstream," "downstream," "up," and "down" are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid. "Down" is directed counter to the direction of flow of well fluid, towards the source of well fluid. "Up" is directed in the direction of flow of well fluid, away from the source of well fluid.

Disclosed embodiments relate generally to improved techniques for forming/assembling rotor bearing assemblies. More specifically, for rotor bearing assemblies which are engaged within the stator by one or more anti-rotation tab, one or more retaining rings can be used to retain the anti-rotation tab in place on the exterior of the rotor bearing assembly. Disclosed embodiments illustrate improved techniques for providing the one or more retaining rings on the rotor bearing assembly and/or for the one or more retaining rings to interact effectively with the anti-rotation tab during installation of the rotor bearing within the stator. Such improved rotor bearing designs may be particularly useful for rotor bearings having ceramic materials and/or for rotor bearings for use in permanent magnet motor (PMM) designs.

Figure 1:
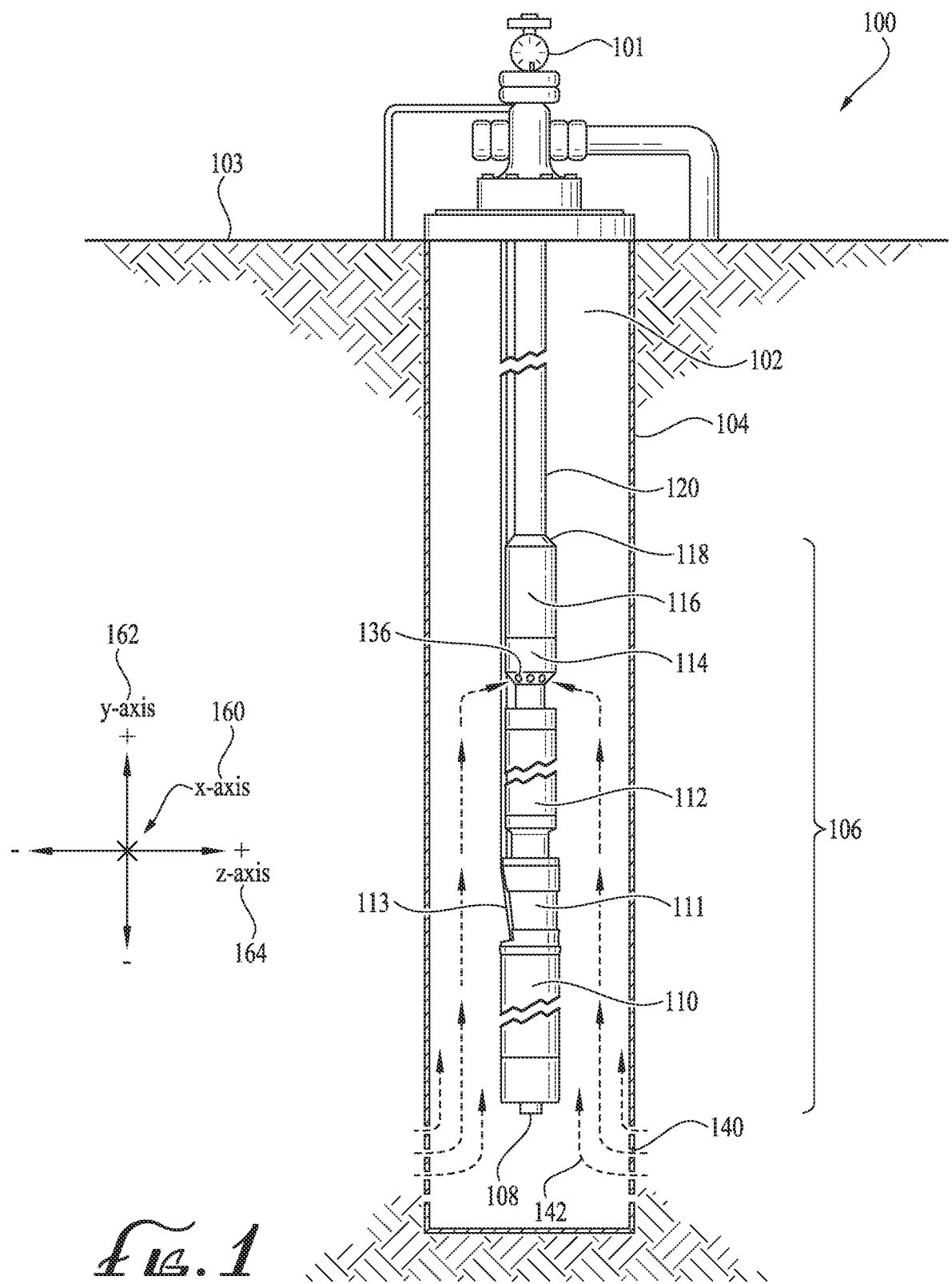
FIG. 1 is a schematic illustration of an exemplary electric submersible pump (ESP) assembly disposed in a wellbore, according to an embodiment of the disclosure.

Turning now to FIG. 1, an exemplary producing well environment 100 is described. In an embodiment, the environment 100 comprises a wellhead 101 above a wellbore 102 located at the surface 103. A casing 104 is provided within the wellbore 102. For convenience of reference, FIG. 1 provides a directional reference comprising three coordinate axes—an X-axis 160 where positive displacements along the X-axis 160 are directed into the sheet and negative displacements along the X-axis 160 are directed out of the sheet; a Y-axis 162 where positive displacements along the Y-axis 162 are directed upwards on the sheet and negative displacements along the Y-axis 162 are directed downwards on the sheet, and a Z-axis 164 where positive displacements along the Z-axis 164 are directed rightwards on the sheet and negative displacements along the Z-axis 164 are directed leftwards on the sheet. In the embodiment of FIG. 1, the Y-axis 162 is approximately parallel to a central axis of a vertical portion of the wellbore 102.

An exemplary electric submersible pump (ESP) assembly 106 is deployed downhole in a well within the casing 104 and comprises an optional sensor unit 108, an electric motor 110 which may include a motor head 111, a seal unit 112, an electric power cable 113, a pump intake 114, a centrifugal pump 116, and a pump outlet 118 that couples the centrifugal pump 116 to a production tubing 120. The centrifugal pump 116 is operatively coupled to the motor 110 by a shaft (not shown). In an embodiment, the ESP assembly 106 may employ thrust bearings in several places, for example in the electric motor 110, in the seal unit 112, and/or in the centrifugal pump 116. While not shown in FIG. 1, in an embodiment, the ESP assembly 106 can comprise a gas separator that may employ one or more thrust bearings. The motor head 111 couples the electric motor 110 to the seal unit 112. The electric power cable 113 may connect to a source of electric power at the surface 103 and to the electric motor 110, for example being configured to provide power from the source of electric power at the surface 103 to the electric motor 110.

In operation, the casing 104 is pierced by perforations 140, and reservoir fluid 142 flows through the perforations 140 into the wellbore 102. The fluid 142 flows downstream in an annulus formed between the casing 104 and the ESP assembly 106, is drawn into the pump intake 114, is pumped by the centrifugal pump 116, and is lifted through the production tubing 120 to the wellhead 101 to be produced at the surface 103. The fluid 142 may comprise hydrocarbons such as oil and/or gas, water, or both hydrocarbons and water.

While the example illustrated in FIG. 1 relates to land-based subterranean wells, similar ESP systems can be used in a subsea environment and/or may be used in subterranean environments located on offshore platforms, drill ships, semi-submersibles, drilling barges, etc. And while the wellbore is shown in FIG. 1 as being approximately vertical, in other embodiments, the wellbore may be horizontal, deviated, or any other type of well. Also, while the pump of the ESP is described with respect to FIG. 1 as a centrifugal pump, other types of pumps (such as a rod pump, a progressive cavity pump, any other type of pump suitable for the system, or combinations thereof) may be used instead.

Figure 2:
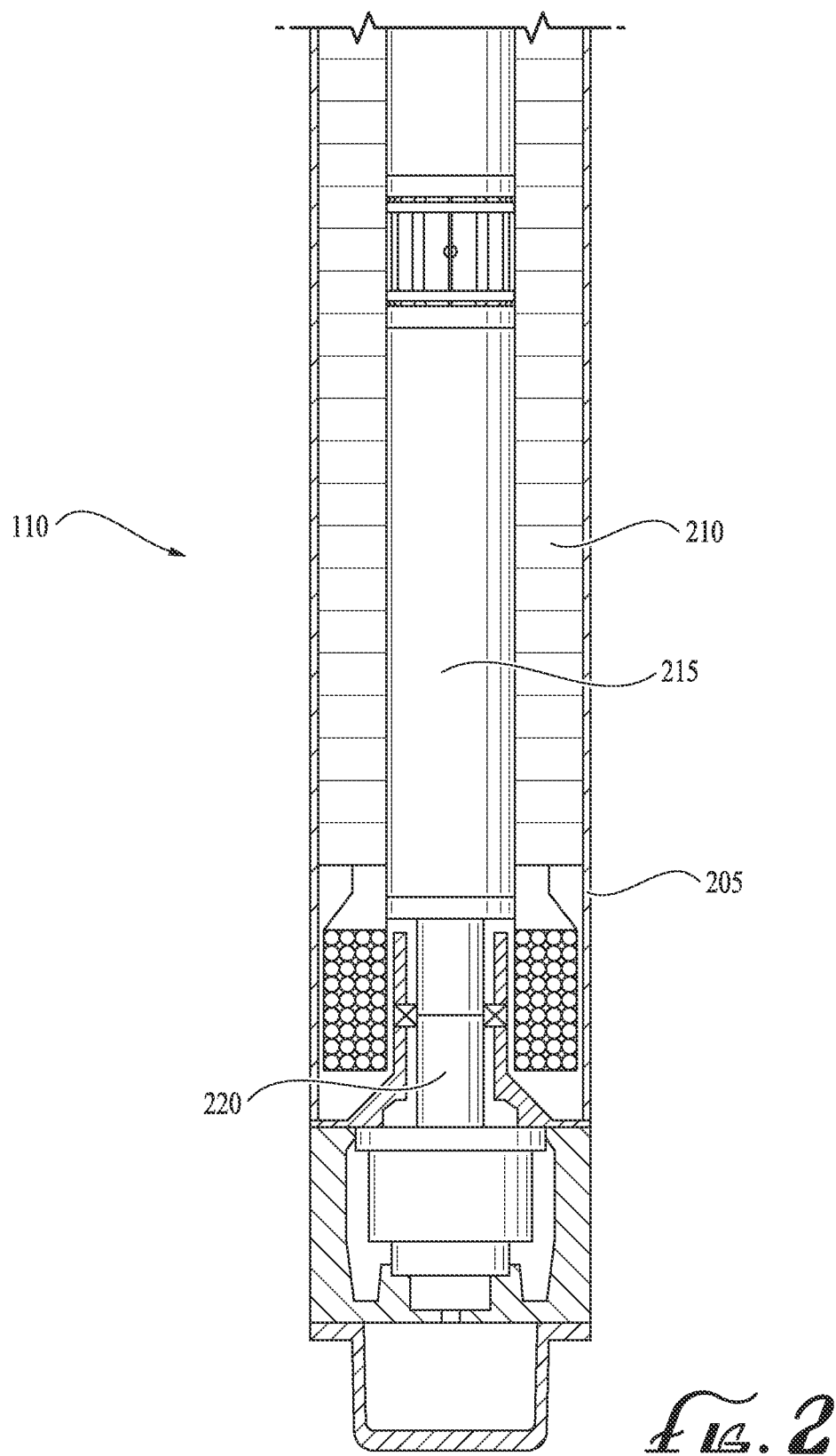
FIG. 2 is a cross-sectional view of an exemplary motor for the electric submersible pump assembly of FIG. 1, according to an embodiment.
Figure 3:
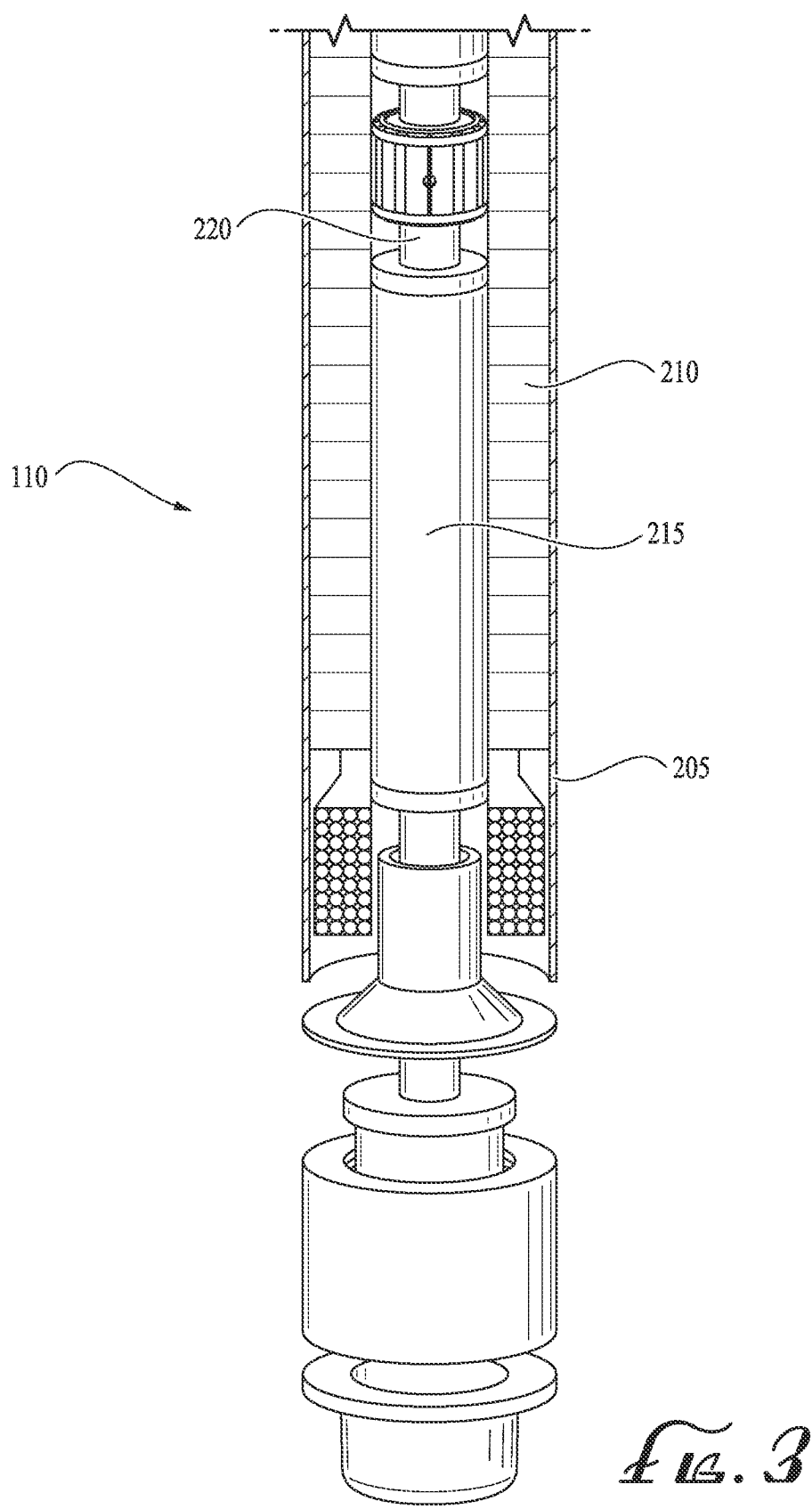
FIG. 3 is an exploded isometric view of the motor of FIG. 2, according to an embodiment of the disclosure.

As shown in FIGS. 2-3, an exemplary motor 110 of the ESP assembly includes a housing 205, a stator 210, a rotor 215, and a drive shaft 220. The housing 205 typically comprises a hollow cylinder or tube and is configured to protect the internal components of the motor 110 from the external environment. The stator 210 also typically comprises a hollow cylinder and is secured to the housing 205 (e.g. to the inner surface of the housing 205) so as to be stationary within the housing 205. Typically, the stator 210 comprises a plurality of laminations, which may be thin sheets of steel, iron, or bronze, wrapped by a plurality of electrically conductive windings. When energized, the windings generate a rotating magnetic field for interaction with the rotor 215 to induce rotation of the rotor 215. The rotor 215 also typically comprises a hollow cylinder and is concentrically arranged between the stator 210 and the drive shaft 220, for example with the drive shaft 220 typically extending longitudinally along the centerline of the motor 110, the rotor 215 disposed around the drive shaft 220, and the stator 210 disposed around the rotor 215, within the housing 205. The rotor 215 is rotatable within the stator 210 and secured to the drive shaft 220, such that rotation of the rotor 215 drives the drive shaft 220. In embodiments, the motor 110 may be a two or more pole motor, a three-phase squirrel cage induction motor, a permanent magnet motor (PMM), or other motor configuration.

Figure 4:
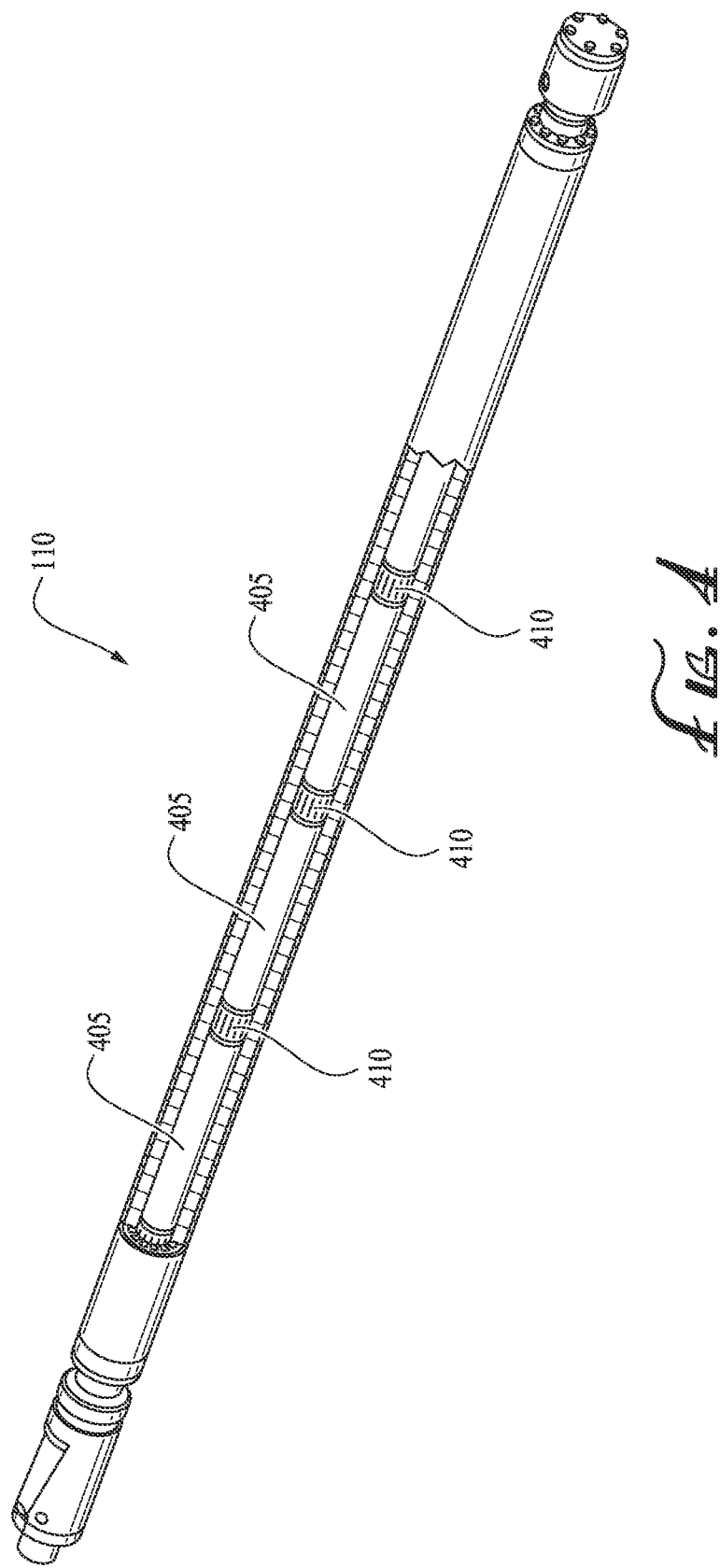
FIG. 4 is a partial cut-away isometric view of an exemplary ESP motor having a plurality of rotor modules with rotor bearing assemblies therebetween, according to an embodiment of the disclosure.

Depending on the power requirements of the motor 110, the rotor 215 typically includes a number of rotor modules, which together jointly form the rotor 215, with each rotor module secured to the drive shaft 220. The rotational magnetic field of the stator 210 when energized can induce rotation of the rotor 215, and thereby the drive shaft 220, with the drive shaft 220 transmitting rotational torque from the motor 110 to the pump 116. As shown in FIG. 4, the rotor modules 405 (jointly forming the rotor 215) are spaced apart from each other along the drive shaft 220, with a rotor bearing assembly 410 typically located between adjacent rotor modules 405. Rotor bearing assemblies 410 can also be located at the top of the uppermost rotor module 405 and/or the bottom of the lowermost rotor module 405 (e.g. at the top and bottom of the rotor). In some embodiments, the rotor bearing assembly 410 can be a hydrodynamic bearing assembly.

Figure 5:
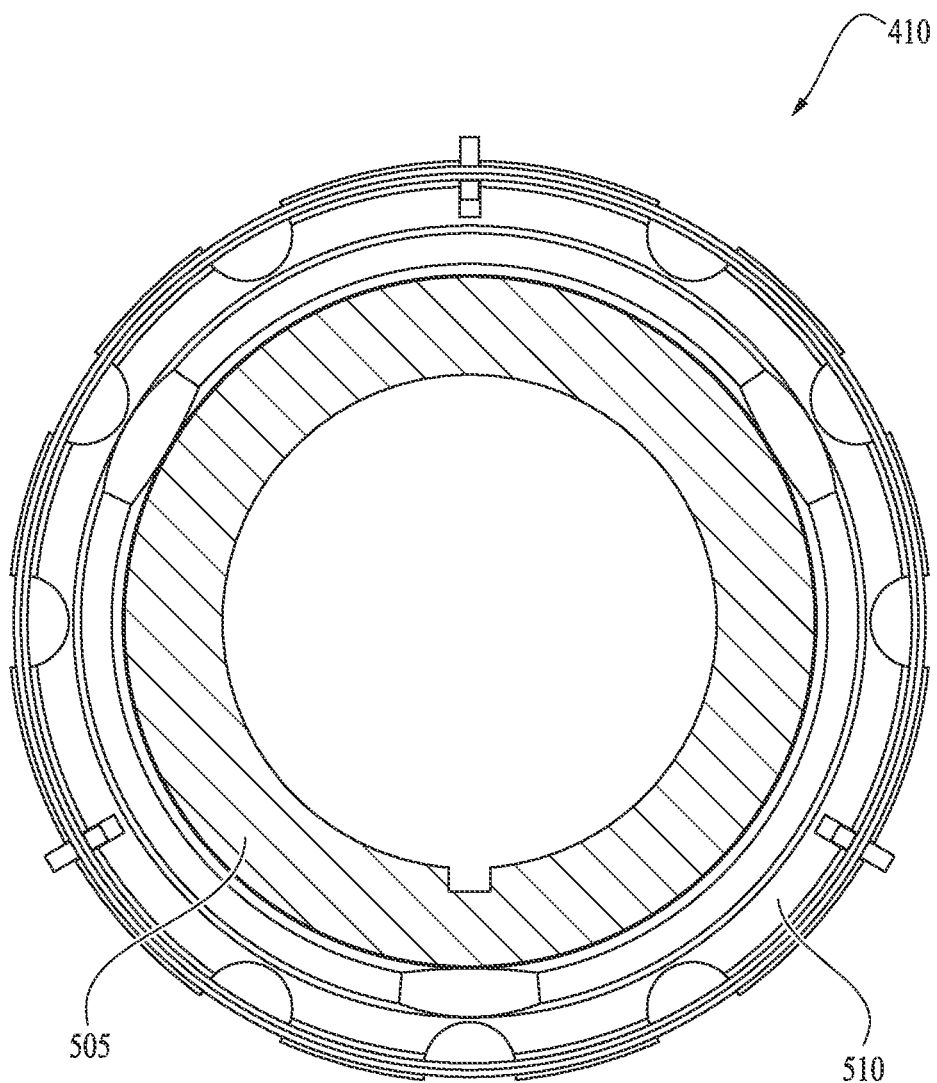
FIG. 5 is a radial cross-sectional view of an exemplary rotor bearing assembly, according to an embodiment of the disclosure.

Each rotor bearing assembly 410 is configured to support the rotor 215 at predefined axial positions to maintain correct radial alignment of the drive shaft 220 during motor operation. As shown in FIG. 5, exemplary rotor bearing assemblies 410 comprise a journal sleeve 505 and a bearing bushing assembly 510. The journal sleeve 505 is secured to the drive shaft 220 and rotates with the drive shaft 220. In embodiments, the inner journal sleeves 505 can be configured to space each rotor module 405 evenly on the drive shaft 220. The outer bearing bushing assembly 510 is concentrically located around the inner journal sleeve 505, and the bearing bushing assembly 510 fixedly engages into the stator lamination (e.g. the bearing bushing assembly is configured to engage the inner surface of the stator 210 to prevent rotation therein). The engagement into the stator lamination is required to ensure that the bearing bushing assembly 510 does not spin during operation, but instead provides a stationary surface within which the inner journal sleeve 505 can rotate, to produce the hydrodynamic lubricating film needed to support the rotor radial load.

Figure 6:
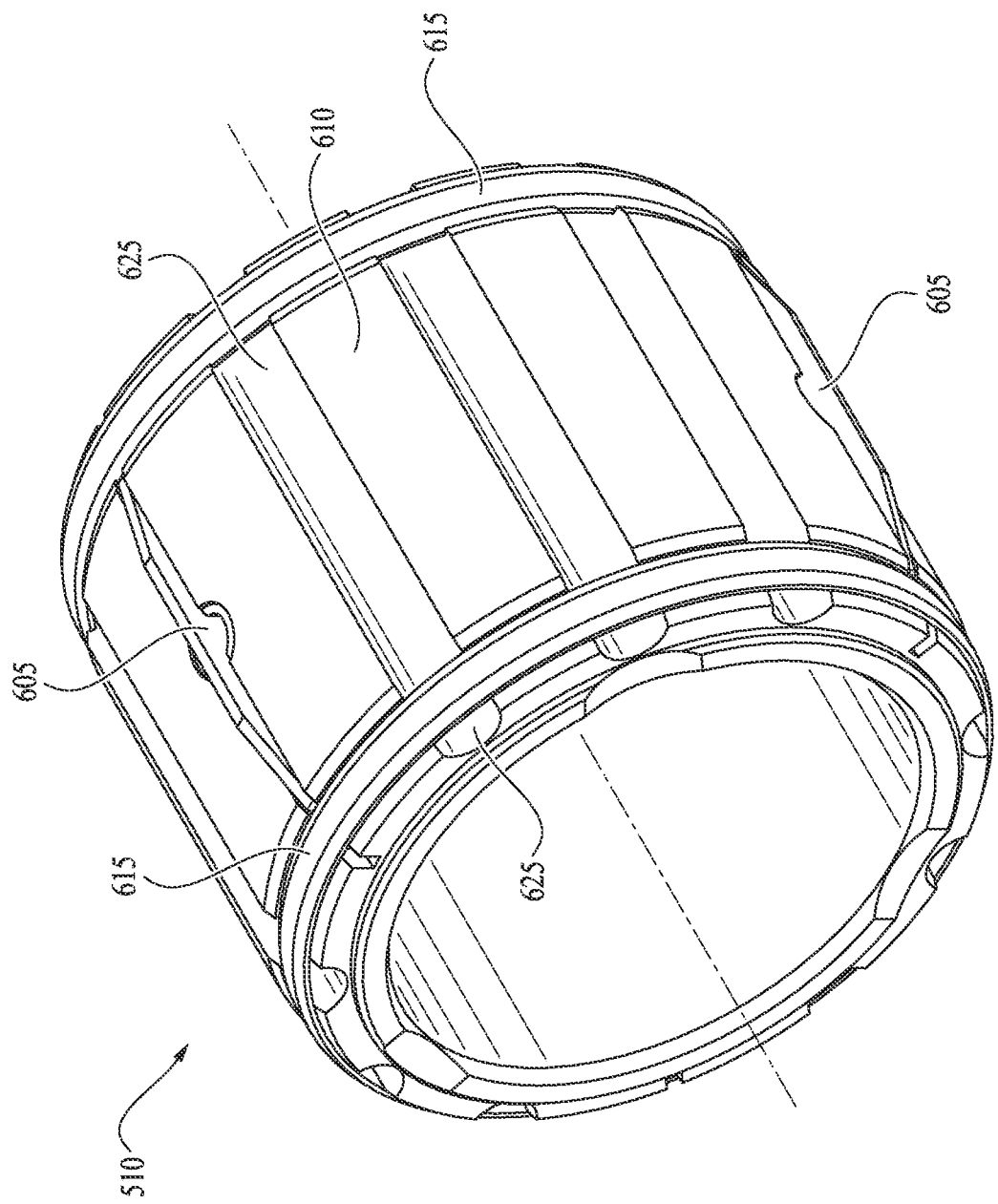
FIG. 6 is an isometric view of an exemplary bearing bushing assembly, according to an embodiment of the disclosure.

One exemplary technique for the bearing bushing assembly 510 to engage the stator 210 (e.g. in a way that prevents rotation of the bearing bushing assembly 510 within the stator 210) uses one or more spring-loaded anti-rotation tab 605. For example, as shown in FIG. 6, the bearing bushing assembly 510 can include a spring-loaded anti-rotation tab 605 which is biased radially outward from the outer surface of the bearing bushing 610 (e.g. to extend radially outward from the outer surface of the bearing bushing 610 unless sufficient radially inward force is applied to the spring-loaded ant-rotation tab 605). The spring-loaded anti-rotation tab 605 may be configured to correspond to a slot in the inner surface of the stator 210 for engagement.

To insert the rotor bearing assembly 410 in place within the stator 210, the spring-loaded anti-rotation tab 605 is compressed, for example so that the exterior of the spring-loaded tab 605 is approximately flush with the outer surface of the rotor bearing assembly 410 (e.g. the outer surface of the bearing bushing 610). The rotor bearing assembly 410 can then be inserted into the open bore of the stator 210. Then, by rotating the rotor bearing assembly 410 within the stator 210, the spring-loaded anti-rotation tab 605 can automatically engage the corresponding slot in the inner surface of the stator 210 when, during rotation, the spring-loaded tab 605 aligns with the slot. This approach allows assembly (e.g. insertion of the rotor bearing assembly 410 within the stator 210) without the need to pre-align the spring-loaded tab 610 with a corresponding slot in the inner surface of the stator 210.

For convenience, a retention device (e.g. a ring) 615 may be used to hold the spring-loaded anti-rotation tab(s) 605 in place on the bearing bushing 610 before installation of the rotor bearing assembly within the stator (e.g. to prevent the spring-loaded tab(s) 605 from separating from the bearing bushing 610). This disclosure provides improved rotor bearing assembly designs and methods. Particularly, improved techniques for retaining the spring-loaded anti-rotation tab (s) 605 in place on the bearing bushing 610 during assembly/installation are disclosed. These improved techniques may be especially useful for bearings formed of hard materials, such as ceramics. For example, by eliminating the need to apply force to fold or bend any portion of the retention device while it is located on a ceramic bearing bushing, the chances of damage to the ceramic material of the rotor bearing assembly can be minimized, thereby reducing the rate of rejection during formation of ceramic rotor bearings.

Figure 7:
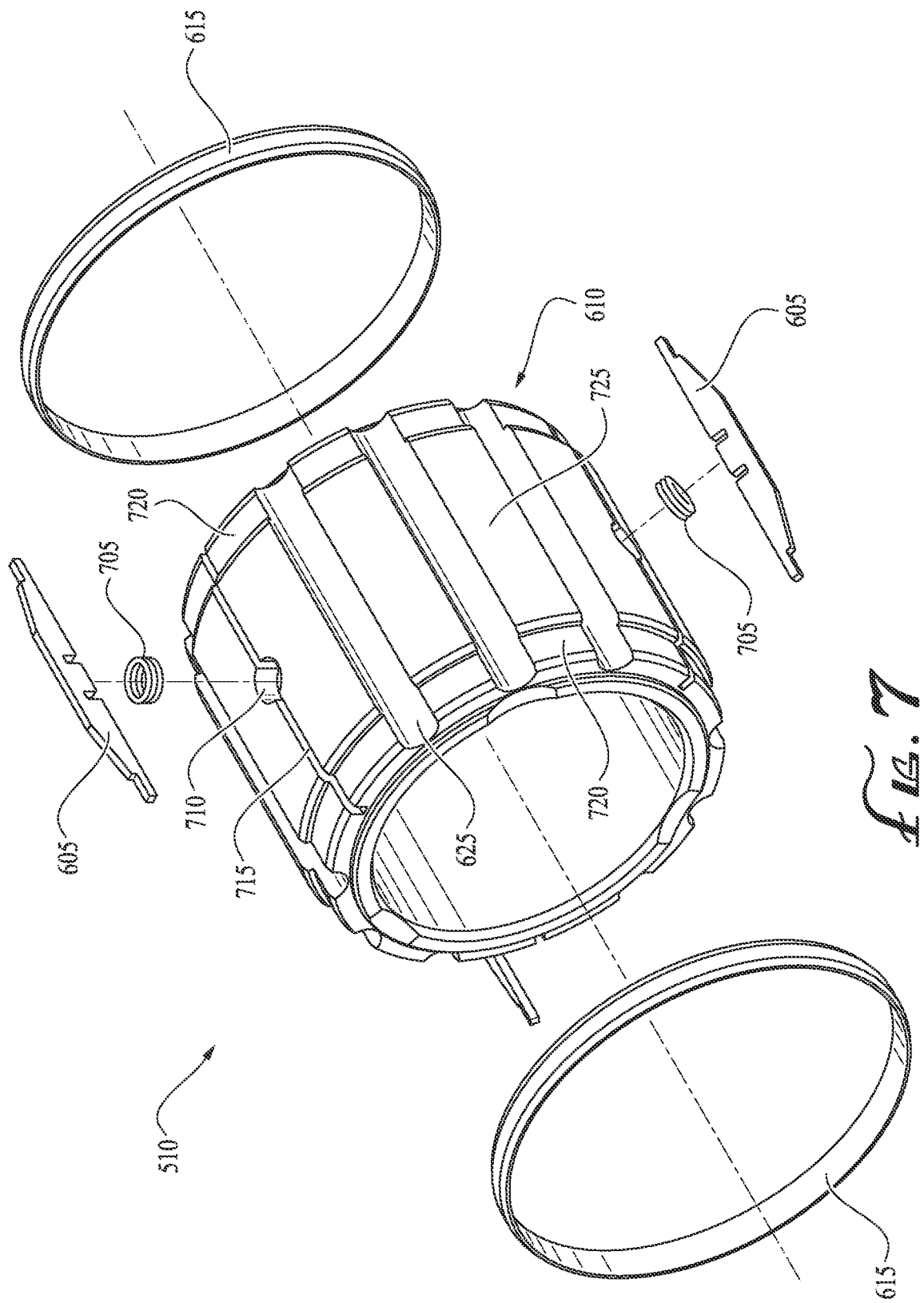
FIG. 7 is an exploded isometric view of the bearing bushing assembly of FIG. 6, according to an embodiment of the disclosure.

An exemplary rotor bearing bushing assembly 510, of the sort which might be used in an ESP motor for use downhole in a well as part of an ESP, is shown in FIGS. 6-7. The rotor bearing bushing assembly 510 can comprise a bearing bushing 610, one or more anti-rotation tab 605, one or more biasing element 705, and one or two retention rings 615. Although FIGS. 6-7 illustrates an exemplary embodiment having a plurality of anti-rotation tabs 605, with a corresponding plurality of biasing elements 705, the disclosure is not so limited. The bearing bushing 610 comprises one or more spring recess 710 extending inward from an outer surface of the bearing bushing 610, one or more axial slot 715 on the outer surface of the bearing bushing 610 (e.g. extending axially, such as approximately parallel to the longitudinal axis of the bearing bushing), and one or more stepped portion 720 of the outer surface having a smaller outer diameter than a main body portion 725 of the bearing bushing 610 (e.g. an inwardly/inset stepped portion). Each axial slot 715 intersects the corresponding spring recess 710. In embodiments, the bearing bushing 610 is substantially cylindrical about a longitudinal axis.

Each anti-rotation tab 605 is configured to fit and extend axially in the corresponding axial slot 715. The anti-rotation tab 605 is configured to be radially slidable within the corresponding axial slot 715. In some embodiments, the anti-rotation tab 605 can extend substantially the entire length of the axial slot 715. Each biasing element 705 (e.g. compression spring) is configured to fit in the corresponding spring recess 710 and to push radially outward on the corresponding anti-rotation tab 605 in the axial slot 715 (e.g. the spring is located beneath/inward of the corresponding anti-rotation tab). Each retention ring 615 is configured for interference fit on the outer surface of the corresponding stepped portion 720 on the outer surface of the bearing bushing 610. Each retention ring 615 overlaps the one or more axial slot 715 and/or the one or more anti-rotation tab 605, in order to hold the one or more anti-rotation tab 605 onto the bearing bushing 610 during installation.

In embodiments, each axial slot 715 and corresponding spring recess 710 can have substantially the same depth (e.g. extend approximately the same distance inward from the outer surface). For example, the depth of the axial slot 715 and/or spring recess 710 can be approximately 50% of the bearing bushing 610 radial thickness. In embodiments, each stepped portion 720 is inset sufficiently so that the retention ring 615 disposed on the stepped portion 720 lies flush or sub-flush with the outer surface (e.g. of the main body portion 725) of the bearing bushing 610. In embodiments, each stepped portion 720 can be located at an axial end of the bearing bushing 610. For example, as shown in FIG. 7, one of two stepped portions 720 can be disposed at each axial end of the bearing bushing 610, and one of two retention rings 615 can be disposed at each axial end of the bearing bushing 610 (e.g. on the corresponding stepped portion 720). Then, both retention rings 615 can hold the anti-rotation tab(s) 605 in place within the corresponding axial slot 715, preventing the anti-rotation tab 605 from radially exiting the axial slot 715 (e.g. by interference fit of the retention ring(s) 615 onto the stepped portions 720 of the outer surface of the bearing bushing 610).

In embodiments, each retention ring 615 can be configured for thermal fitting onto the bearing bushing 610 for interference fit. For example, each retention ring 615 can be configured so that: at a room temperature, the retention ring 615 has an inner diameter less than the outer diameter of the stepped portion 720 (e.g. by about 20-30 micrometers or about 0.0008-0.0011"); at an operating temperature (which may include a safety factor, e.g. minimum 10% above the expected operating temperature at which the bearing may be used when the motor is operating), the retention ring 615 has an inner diameter less than the outer diameter of the stepped portion 720, so that the retention ring 615 compresses onto the stepped portion 720 for interference fit; and/or at an installation temperature (which may be pre-set based on the Coefficient of Thermal Expansion (CTE) of the retention ring compared to the CTE of the bearing bushing), the retention ring 615 has an inner diameter greater than the outer diameter of the stepped portion 720 (e.g. by about 70-80 micrometers or about 0.0027-0.0031"). In some embodiments, the retention ring(s) 615 may have an inner diameter less than the outer diameter of the main body portion 725 of the bearing bushing 610 at installation temperature (e.g. when the retention ring 615 is at installation temperature, and the bearing bushing 610 may typically be at room temperature), which may allow the retention ring 615 to be easily slid into place on the stepped portion 720 during installation/assembly (e.g. with the main body portion 725 acting as a stop to locate the retention ring 615 on the stepped portion 720). In embodiments, each retention ring 615 can be configured to remain securely on the stepped portion 720 via interference fit at both room temperature and operating temperature (which would be greater than room temperature).

In embodiments, the installation temperature can be higher than the operating temperature, and upon cooling of the retention ring 615 from the installation temperature to the room temperature, the retention ring 615 can be interference fit onto the stepped portion 720. In other embodiments, the installation temperature can be below or approximately the same as the operating temperature. For example, the installation temperature can be lower than the operating temperature because, when dissimilar materials are used (e.g. the bearing bushing 610 made of bronze and the retention ring 615 made of steel), the bearing bushing 610 can expand more than the retention ring 615 at operating temperature, thus increasing the interference fit set at room temperature. In embodiments, in operation conditions, both the retention ring 615 and the bearing bushing 610 may be heated to operating temperature, which may cause both elements to expand and/or may maintain the interference fit at operating temperature (e.g. based on the CTE of the retention ring 615 and the bearing bushing 610). For example, the interference fit at operating temperature can be at least about 1 MPa, such as approximately 1-4.8 MPa So for example, the installation temperature of the retention ring 615 can be below, approximately the same as, or above the operating temperature based on the material combination selected (e.g. based on the CTE difference of the material combination). For materials with similar CTE (e.g. steel retention ring 615 on steel bearing bushing 610), the installation temperature can be close to (e.g. approximately the same as) the operating temperature; when the bearing bushing 610 has a higher CTE than the retention ring 615 (e.g. when the bearing bushing 610 is made of bronze and the retention ring 615 is made of steel), the installation temperature can be lower than the operating temperature; and when the bearing bushing 610 has a lower CTE than the retention ring 615 (e.g. the bearing bushing 610 is made of Zirconia ceramic and the retention ring 615 is made of steel), the installation temperature can be higher.

In embodiments, the contact pressure due to the interference fit of the retention ring 615 onto the stepped portion 720 can be a minimum of about 4.5 MPa (e.g. 650 psi) at room temperature and/or a minimum of about 1 MPa (e.g. 145 psi) at operating temperature. For example, tolerance case dependent, the contact pressure can be approximately 4.5-8.5 MPa at room temperature and/or approximately 1-4.8 MPa, at operating temperature.

In embodiments, the inner diameter of each retention ring 615 at operating temperature is configured to be greater than the inner diameter of that retention ring 615 at room temperature, and the interference fit of each retention ring 615 on the stepped portion 720 at both room temperature and operating temperature of the bearing assembly 510 does not generate radially inward force sufficient to damage the bearing bushing 610 (e.g. not in excess of the compressive strength of the bearing bushing 610). In some embodiments, the CTE of each retention ring 615 can be greater than the CTE of the bearing bushing 610. In other embodiments, the CTE of the bearing bushing 610 can be similar to the CTE of each retention ring 615 (for example+/−about 30% the CTE of the retention ring 615). In some embodiments, the CTE of the bearing bushing 610 can be similar to the CTE of low alloy steel and/or about 70% the CTE of stainless steel (e.g. 300 series stainless steel, such as stainless steel 316). In embodiments, each retention ring 615 can be formed of low alloy steel or stainless steel (such as 300 series stainless steel). In other embodiments, each retention ring 615 can be formed of nickel alloy (such as Inconel, Incoloy, or Monel for example). In some embodiments, the bearing bushing 610 can be formed of ceramic material (e.g. having high fracture toughness and impact resistance, while providing significant flexural strength). For example, the ceramic material can comprise a zirconia compound (e.g. 3% Yttria stabilized zirconia). In some embodiments, the bearing bushing 610 can be formed of steel (e.g. 300 series stainless steel) or bronze. In embodiments, each anti-rotation tab 605 can comprise nickel alloy or stainless steel or alloy steel. For example, the anti-rotation tab 605 can be stamped from nickel alloy sheeting. Alternatively, the anti-rotation tab 605 can be water jet or laser cut. Use of non-magnetic steel or nickel alloy (e.g. for the retention rings 615 and/or the anti-rotation tabs 605) can be useful in a PPM motor, for example minimizing Eddy-current losses due to interaction of the rotating magnetic field and the metallic stationary components.

In the case of the bearing bushing 610 being formed of Zirconia composite material and the retention ring 615 being formed of Inconel steel, an interference of approximately 0.12-0.125% of the bearing bushing outer diameter at room temperature may be appropriate. This will ensure that the fit of the retention ring 615 onto the bearing bushing 610 will be still maintained in the bearing assembly at operating temperature (e.g. the motor rated temperature, which may be approximately 220° C./428° F.) Similarly, for steel bearing bushings 610, the interference can be between approximately 0.043-0.045% of the outer diameter of the bearing bushing 610, and for bronze bearing bushings 610, the interference can be approximately 0.025-0.035% of the outer diameter of the bearing bushing 610. As the bearing bushing diameter changes, the percentage of interference between the retention ring 615 and the bearing bushing 610 can also change.

In embodiments, each retention ring 615 can be a solid, unbroken ring, with the ring spanning a full circumference of the bearing bushing 610 (e.g. entirely encircling the bearing bushing on the stepped portion 720 of the outer surface and/or solid across its length and width with no breaks or gaps), as shown in FIGS. 6-7. In other embodiments (not shown), the retention ring may not be a solid, full circumference ring (e.g. may have a gap), but the retention ring must nevertheless be able to provide sufficient interference fit with the stepped portion and must overlap the axial slot(s) and/or the anti-rotation tab(s). In embodiments, each retention ring 615 can comprise a lead-in chamfer 805, which may have a smaller outer diameter than the main body of the retention ring. For example, the lead-in chamfer may be wedge-shaped, with smallest outer diameter in proximity to the axial end that enlarges as it extends inward, and may be configured to be located in proximity to an axial end of the bearing bushing 610, for example to assist in sliding the bearing assembly 510 within the stator and/or reducing the chances of damaging the stator during installation.

In embodiments, each axial slot 715 can extend approximately an axial length of the bearing bushing 610. In embodiments, each spring recess 710 can be approximately centered on the length of the bearing bushing 610 (e.g. on the midpoint of the length of the corresponding axial slot 715). In embodiments, each biasing element 705 can be a compression spring. For example, each compression spring can be a wave-type spring, and the corresponding spring recess can be a counter bore (e.g. approximately cylindrical, with approximately circular opening). Exemplary wave-type springs can have the same spring rate as a traditional round wire coil spring for a reduced spring height. Wave-type compression springs can be accommodated in thinner cross-section bearing bushings due to their reduced height, and so may be used in such applications. In other embodiments, for example as shown in FIGS. 12-16, each biasing element 705 can be a linear spring, and each spring recess 710 can be a corresponding axially extending spring slot, with the spring slot being wider than the axial slot for the anti-rotation tab and the axial slot having a length greater than the length of the slot-shaped spring recess. Linear springs can be accommodated in thinner cross-section bearing bushings due to their reduced height, and so may be used in such applications.

In embodiments, the bearing bushing 610 can further comprise one or more oil flow passage slots 625 extending axially in the outer surface of the bearing bushing 610. Each axial slot 715 for the anti-rotation tab 605 is (e.g. circumferentially) offset from the oil flow passage slots 625. Typically, the retention ring 615 blocks no more than about 45% (e.g. about 10-45%) of the oil flow passage slot 625 cross-section. In embodiments, each biasing element 705 for a corresponding anti-rotation tab 605 can consist of a single spring (e.g. located approximately at the midpoint of the axial length of the bearing bushing 610 and/or approximately at the midpoint of the corresponding anti-rotation tab 605).

Figure 8:
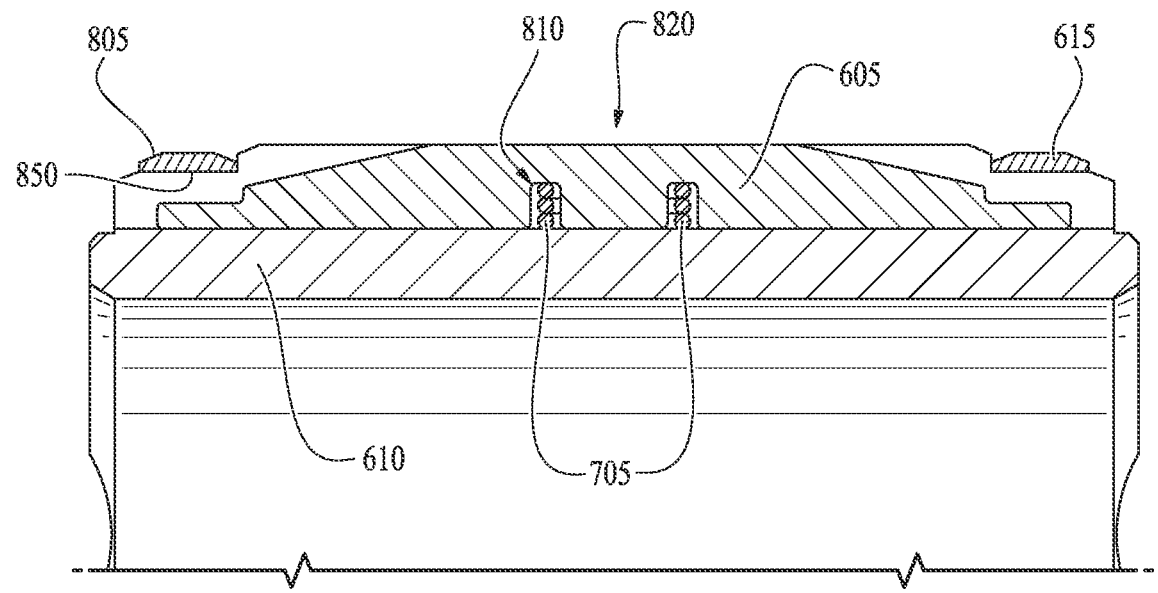
FIG. 8 is an axial cross-section view of the bearing bushing assembly of FIG. 6, with the anti-rotation tabs compressed (e.g. not extended for engagement with the stator), according to an embodiment of the disclosure.
Figure 9:
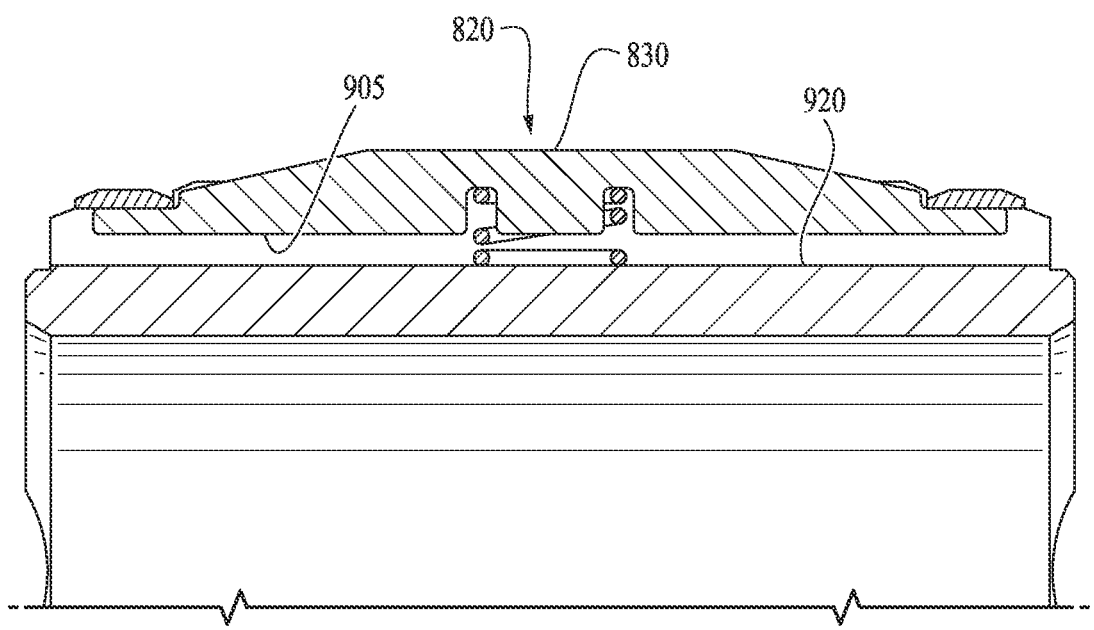
FIG. 9 is an axial cross-section view of the bearing bushing assembly of FIG. 6, with the anti-rotation tab extended, according to an embodiment of the disclosure.

In embodiments, for example as shown in FIGS. 8-9, a bottom 905 of each anti-rotation tab 605 can comprise recesses/insets 810 (e.g. two recesses) configured to fit the corresponding compression spring. Typically, the recesses 810 extend only partially through a height of the tab. In embodiments, the recesses 810 can be configured to fix the axial position of the compression spring with respect to the anti-rotation tab 605 and/or the tab 605 in the axial slot 715. In embodiments, a portion of the bottom 905 of the anti-rotation tab 605 can extend into the center of the compression spring.

In embodiments, the anti-rotation tab 605 has a height profile sloping upward while extending axially inward, such that a central portion 820 of the anti-rotation tab 605 has a greater height than portions of the anti-rotation tab 605 in proximity to axial ends of the anti-rotation tab 605. For example, an upper surface/top 830 of the anti-rotation tab 605 is sloped/angled in proximity to both its axial ends, with a lower height at the axial end that becomes greater as the slope extends axially inward (e.g. away from the corresponding axial end and towards the center portion 820 of the anti-rotation tab 605). In embodiments, an upper surface/top 830 of each anti-rotation tab 605 can be flat at both axial ends, slope upward as extending inward, and/or have a flat center portion 820 having a height greater than the height of the flat axial ends. In embodiments, the upper surface 830 of each anti-rotation tab 605, between the two flat axial ends, is unbroken (e.g. no holes, slots, or indentations).

FIG. 8 depicts the axial cross section through the bearing bushing assembly 510 when the anti-rotation tab 605 is fully depressed into the bearing bushing 610, while FIG. 9 depicts the axial cross section through the bearing bushing assembly 510 when the anti-rotation tab 605 is fully extended from the bearing bushing 610. The anti-rotation tab 605 radial displacement in the axial slot 715 is limited by the slot bottom surface 920 (e.g. when tab fully depressed) and by the retention ring 615 inner surface 850 (e.g. when tab fully extended). At these limits, the bottom surface 905 of the anti-rotation tab 605 contacts the slot bottom surface 920, and the flat portion (e.g. at the axial ends of the) upper surface 830 of the anti-rotation tab 605 contacts the inner (e.g. underside) surface 850 of the retention ring(s) 615 respectively. Typically, the bearing bushing assembly 510 is configured so that the compression spring never reaches its solid height or its free length. In embodiments, axial movement of the anti-rotation tab 605 inside the axial slot 715 is limited by the compression spring, which is trapped in the spring recesses 810 of the anti-rotation tab 605 and the counterbore 710 in the bearing bushing 610. The lead in chamfer 805 can aid the installation of the bearing assembly 410 into the bore of the stator (e.g. avoiding sharp edges that could catch on features in the stator bore, i.e. uneven surface of the lamination stack).

Figure 11:
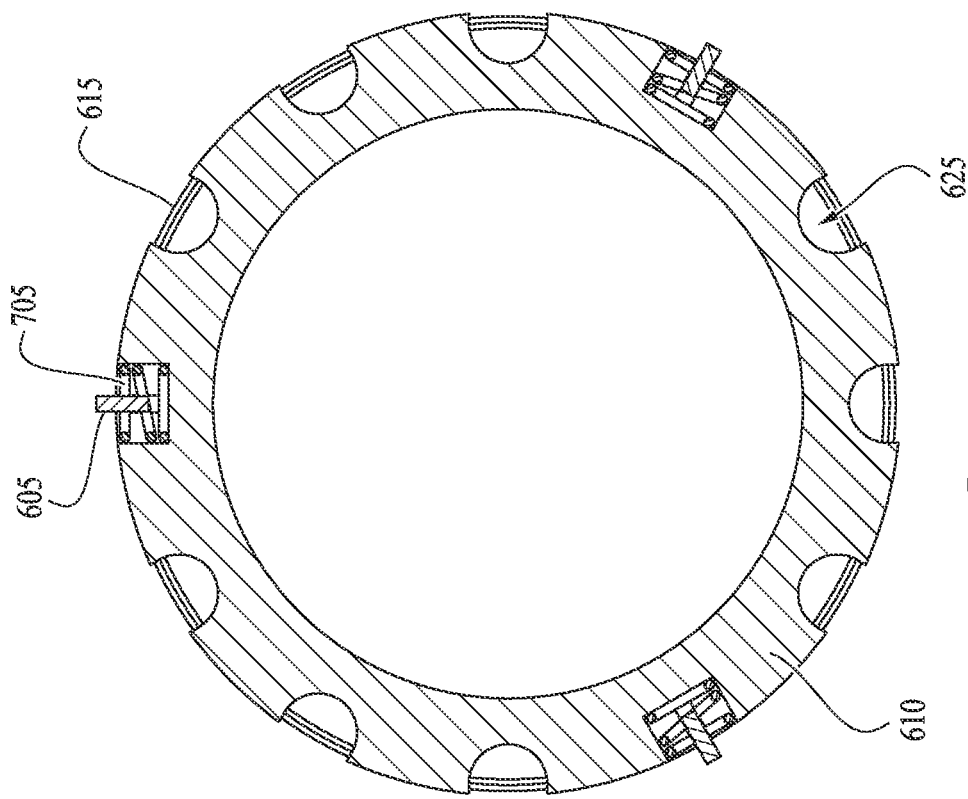
FIG. 11 is a radial cross-section view of the bearing bushing assembly of FIG. 9, according to an embodiment of the disclosure.
Figure 10:
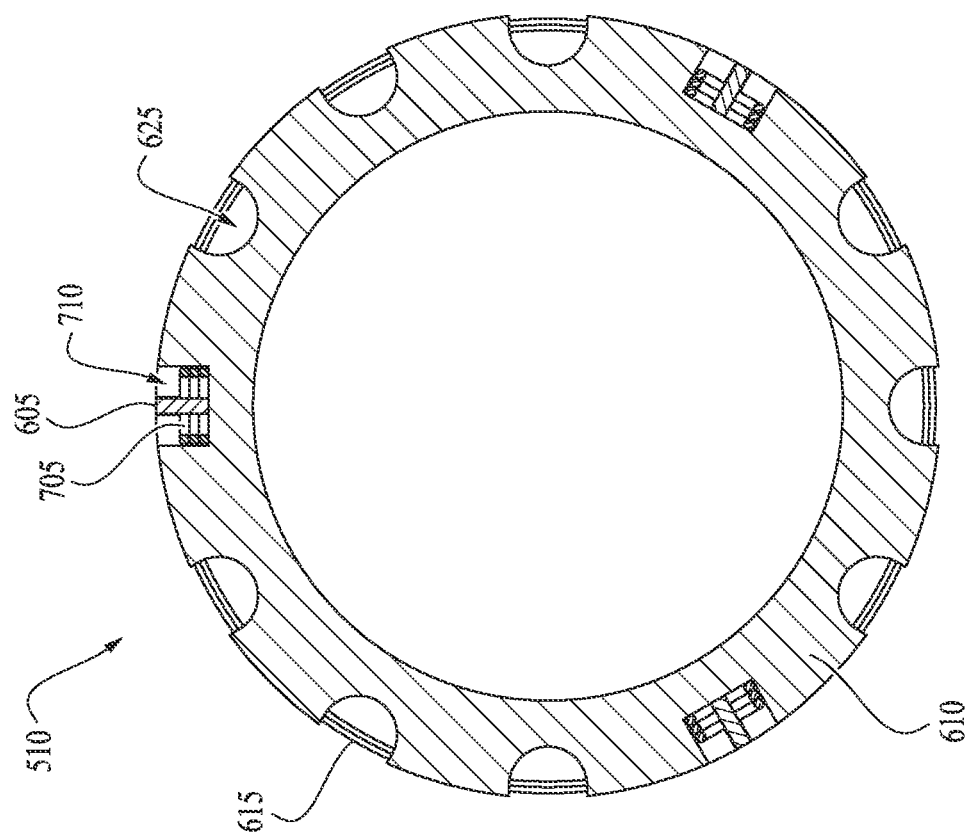
FIG. 10 is a radial cross-section view of the bearing bushing assembly of FIG. 8, according to an embodiment of the disclosure.
Figure 18:
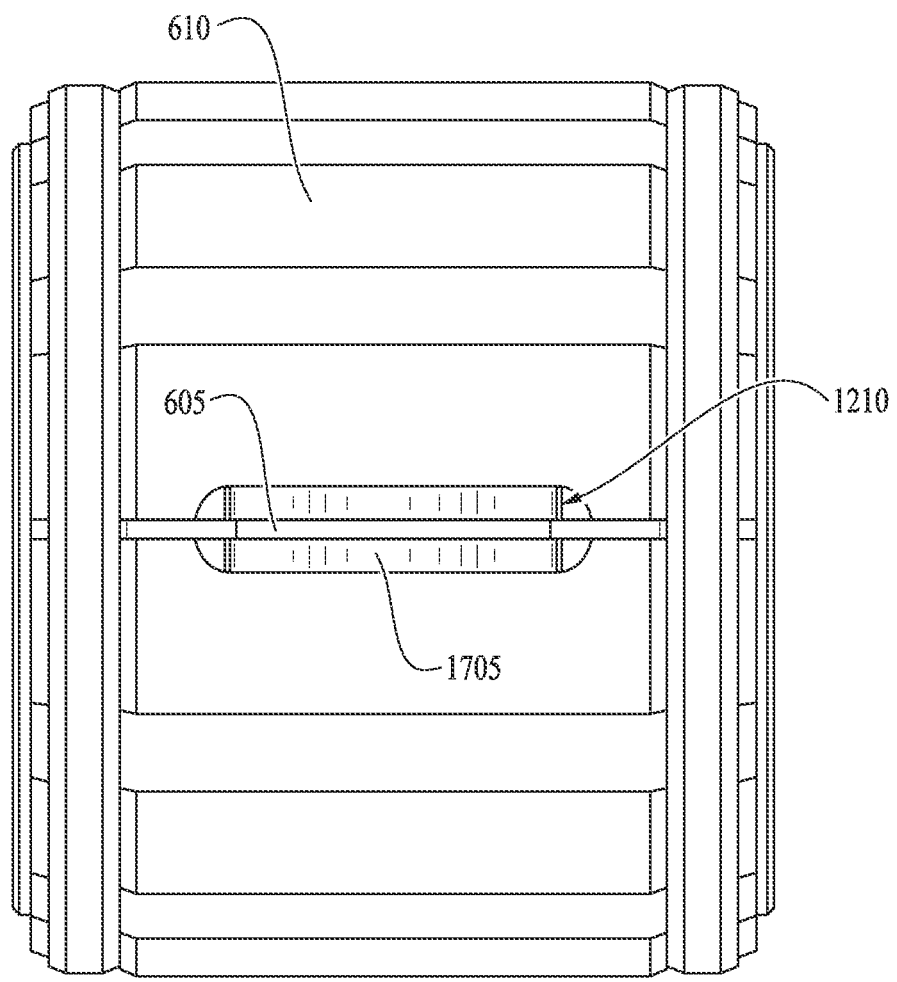
FIG. 18 is a side view of the bearing bushing assembly of FIG. 17, according to an embodiment of the disclosure.
Figure 19:
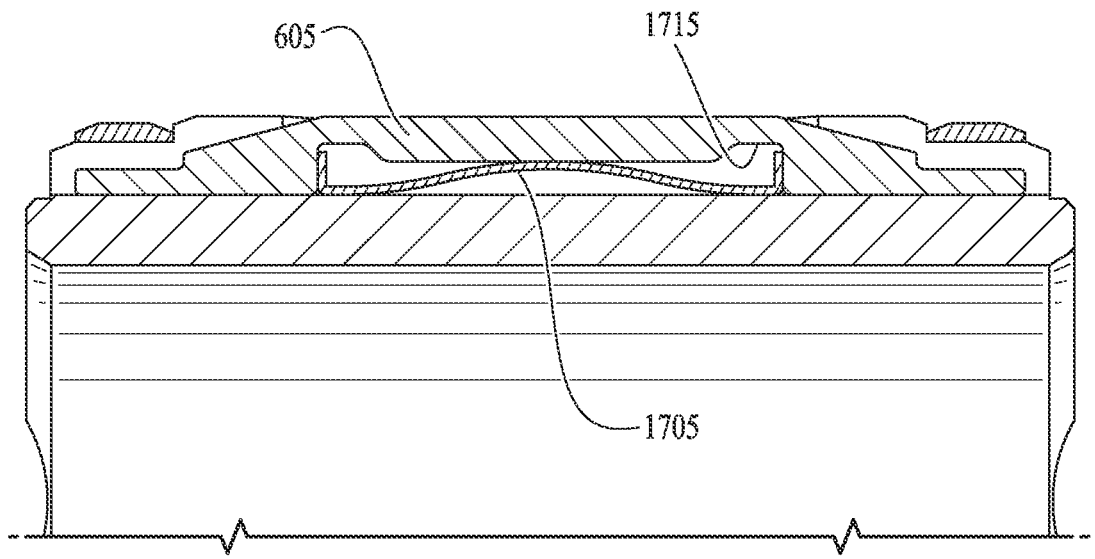
FIG. 19 is an axial cross-section view of the bearing bushing assembly of FIG. 17, with the anti-rotation tab compressed, according to an embodiment of the disclosure.
Figure 20:
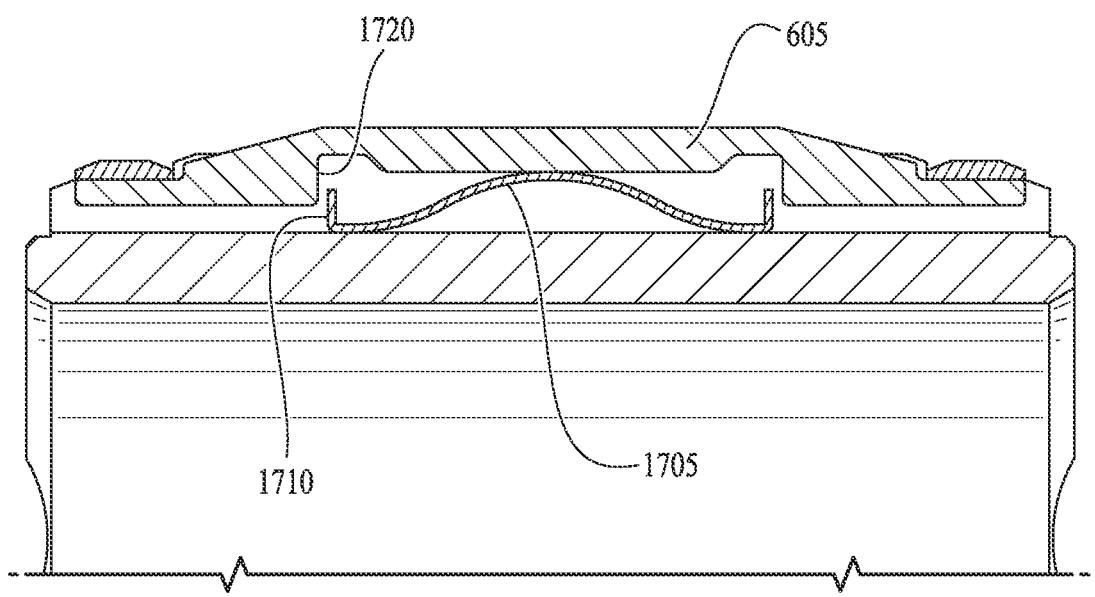
FIG. 20 is an axial cross-section view of the bearing bushing assembly of FIG. 17, with the anti-rotation tab extended, according to an embodiment of the disclosure.

In the cross-sections shown in FIG. 10 and FIG. 11, a different view of the depressed and fully extended anti-rotation tabs 605 and biasing element 705 (e.g. compression springs) is depicted. These figures also show the oil flow passage slots 625, disposed on the outer diameter of the bearing bushing 610, and which run parallel with the axis of the bearing bushing 610. It should be noted, that the oil flow passage slots 625 typically are relatively open, despite the anti-rotation tab retention ring 605 location (which does span and therefore cover a small area of these slots. For example, the retention ring may not block more than about (e.g. about 10-45%) of the flow-through area of the oil flow passage slots 625.

FIG. 12 illustrates an isometric exploded view of an alternate embodiment of the bearing bushing assembly 510, which may be configured for use with linear springs 1205 (e.g. serving as the biasing element in this embodiment) disposed within a spring slot 1210 and biasing the anti-rotation tabs 605 radially outward. FIG. 13 and FIG. 14 depict the axial cross section through the bearing bushing assembly 510 of FIG. 12, when the anti-rotation tab 605 is fully depressed into and fully extended from the bearing bushing 610 respectively. The radial displacement of the anti-rotation tab 605 in the axial slot 715 is limited by the slot bottom surface 920 (tab fully depressed) and by the retention ring inner surface 850 (tab fully extended). At these limits, the bottom surface 905 of the anti-rotation tab 605 contacts the slot bottom surface 920, and the upper surface 830 of the anti-rotation tab 605 contacts the inner surface 850 of the retention ring 615 respectively. Typically, the bearing bushing assembly 510 is configured so that the compression spring never reaches its solid height or its free length. Axial movement of the anti-rotation tab 605 inside the axial slot 715 can be limited by the inside face 1405 of the retention ring 615, due to the contact between inside face 1405 of the retention ring 615 and end face 1410 of the anti-rotation tab 605.

In some embodiments (see FIG. 12), each retention ring 615 can further comprise an inward extension 1220 corresponding to each axial slot 715 and configured to align with the corresponding axial slot 715 to limit axial movement of the anti-rotation tab 605 with the axial slot 715 (e.g. to block or close the open ends of the axial slot 715). In other embodiments (e.g. as shown in FIGS. 17-20), each linear spring can be curved upward in proximity to both its axial ends to form edges, which may limit axial movement of the liner spring within the axial slot (and such embodiments may not include inward extensions on the retention rings).

In the cross-sections shown in FIG. 15 and FIG. 16, a different view of the depressed and fully extended anti-rotation tabs 605 and linear springs 1205 is depicted. Also shown is the oil flow passage slots 625, disposed on the surface of the bearing bushing 610, which run parallel with the axis of the bearing bushing 610. It should be noted, that these oil flow passage slots 625 are relatively open, despite the anti-rotation tab retention ring 615 location, which covers some of the area of these slots (e.g. about 45%).

FIG. 17 illustrates an isometric exploded view of another exemplary embodiment of the bearing bushing assembly 510. In this embodiment, the biasing element can comprise a custom linear spring 1705 (e.g. formed with locking projections 1710, which may be disposed at each end), and the corresponding anti-rotation tab 605 can be shaped in such way as to accept the custom linear spring 1705 and the retention ring 615 (which may be similar to the retention ring of FIG. 7). For example, the anti-rotation tab 605 may have a recess 1715 in its bottom surface configured to fit the custom linear spring 1705. To prevent axial movement of the anti-rotation tab 605, the custom linear spring 1705 can be shaped in such way that the locking projections 1710 butt against the faces 1720 of the recess 1715 of the anti-rotation tab 605. Since the custom linear spring 1705 locates snugly inside the spring slot 1210 in the bearing bushing 610, the custom linear spring 1705 can mechanically restrict axial movement of the anti-rotation tab 605. When the anti-rotation tab 605 is depressed inside the bearing bushing 610 (e.g. when the bearing is sliding into the bore of the stator), the locking projections 1710 on the custom linear spring can act as the mechanical stop for the anti-rotation tab 605 (FIG. 19), for example with the full length of the locking projections 1710 being engaged with the face 1720 on the anti-rotation tab 605. When the anti-rotation tab 605 is fully extended (e.g. when the bearing is in operation), the axial displacement limit for the anti-rotation tab 605 can be provided predominantly by the retention ring 615 (FIG. 20), although there still can be a limited engagement between the locking projections 1710 on the custom linear spring 1705 and the anti-rotation tab 605.

As noted above, the rotor bearing bushing assembly 410 can comprises a plurality of (e.g. 2-8, 2-6, 3-6, 3-4, or 3) anti-rotation tabs 605, with corresponding plurality of axial slots 715 and biasing elements 705. Typically, the plurality of anti-rotation tabs 605 are approximately evenly spaced about the circumference of the bearing bushing 610. And as noted above, typically the rotor bearing bushing assembly 510 comprises two retention rings 615, for example with one retention ring 615 disposed at each axial end of the bearing bushing. Accordingly, a stepped portion 720 may be located at each axial end of the bearing bushing 610, with the corresponding retention ring 615 disposed thereon. FIGS. 6-11 illustrate an exemplary bearing bushing assembly 510 embodiment using wave-type springs. FIGS. 12-16 illustrate another exemplary bearing bushing assembly 510 embodiment using linear springs, while FIGS. 17-20 illustrate yet another exemplary bearing bushing assembly 510 having custom linear springs.

Exemplary methods for assembling a bearing bushing assembly 510 (e.g. for an ESP motor for use downhole in a well as part of an ESP), can comprise: installing a biasing element 705 (e.g. spring) into a corresponding spring recess 710 extending inward from an outer surface of a bearing bushing 610; installing an anti-rotation tab 605 in an axial slot 715 on the outer surface of the bearing bushing 610, thereby compressing the biasing element 705 so that the anti-rotation tab 605 is approximately flush (or sub-flush) with the outer surface of the bearing bushing 610; and thermally fitting a retention ring 615 onto an inwardly stepped portion 720 of the outer surface of the bearing bushing 610, wherein the retention ring 615 holds the anti-rotation tab 605 onto the bearing bushing 610. In embodiments, thermally fitting a retention ring 615 can comprise: heating the retention ring 615 to an installation temperature, sliding the heated retention ring 615 onto the stepped portion 720 of the outer surface of the bearing bushing 610; and cooling the retention ring 615 to provide an interference fit securing the retention ring 615 to the stepped portion 720 of the outer surface of the bearing bushing 610. In embodiments, the bearing bushing 610 is approximately room temperature when the heated retention ring 615 is slid onto the bearing bushing 610. In some embodiments, the installation temperature can be above the operating temperature. In other embodiments, the installation temperature can be below or approximately the same as the operating temperature. In embodiments, the installation temperature can be set based on the CTE difference between the materials of the bearing bushing 610 and the retention ring 615. In embodiments, cooling the retention ring 615 can comprise cooling the retention ring 615 to a room temperature, which is below the operating temperature. In embodiments, sliding the heated retention ring 615 onto the stepped portion 720 can occur without the need to align the retention ring 615 with any portion of the bearing bushing 610. In embodiments, the interference fit secures the retention ring 615 to the bearing bushing 610 at both the room temperature and the operating temperature.

As shown in FIG. 6, the retention ring 615 typically forms a full circumference around the bearing bushing and/or spans all oil flow passages in the outer surface of the bearing bushing. In embodiments, the retention ring 615 can be disposed in proximity to the axial end of the bearing bushing 610, and no portion of the anti-rotation tab 605 extends axially beyond the retention ring 615 in the direction of the axial end. In embodiments, the retention ring 615 can contact the anti-rotation tab 605 in proximity to the axial end of the anti-rotation tab 605.

With respect to the thermal/interference fit, at a room temperature, the retention ring 615 can have an inner diameter less than the outer diameter of the stepped portion 720 (e.g. by about 20-30 micrometers or about 0.0008-0.0011"); at an operating temperature (which may include a safety factor, e.g. minimum 10% above the expected operating temperature at which the bearing may be used when the motor is operating), the retention ring 615 can have an inner diameter less than the outer diameter of the stepped portion 720, so that the retention ring 615 compresses onto the stepped portion 720 for interference fit; and/or at an installation temperature (which may be pre-set based for example on the CTE of the retention ring 615 compared to the CTE of the bearing bushing 610), the retention ring 615 can have an inner diameter greater than the outer diameter of the stepped portion 720 (e.g. by about 70-80 micrometers or about 0.0027-0.0031"). This approach can allow the retention ring 615 to be slid onto the stepped portion 720 when heated to installation temperature during installation/assembly, and then to compress into interference fit onto the stepped portion 720 of the bearing bushing 610 as it cools to room temperature. The interference fit can be maintained at operating temperature as well (e.g. when the bearing bushing assembly is in use within the ESP motor).

Exemplary method embodiments can further comprise selecting and/or providing the retention ring 615 and the bearing bushing 610 (e.g. material), wherein the CTE of the retention ring 615 is similar to the CTE of the bearing bushing 610 (e.g. +/−30%). Exemplary embodiments can include sizing the inner diameter of the retention ring 615 based on CTE difference between the retention ring 615 and the bearing bushing 610. Exemplary method embodiments can comprise: sizing the retention ring 615 based on room temperature inner diameter of the retention ring 615, operating temperature inner diameter of the retention ring 615, installation temperature inner diameter of the retention ring 615, room temperature outer diameter of the bearing bushing 610, operating temperature outer diameter of the bearing bushing 610, and/or installation temperature outer dimeter of the bearing bushing 610. Exemplary method embodiments can further comprise sizing the retention ring 615 with respect to the bearing bushing 610 based on desired radially inward force/pressure from the interference fit to effectively grip the stepped down portion 720 of the outer surface of the bearing bushing 610.

In some embodiments, heating the retention ring 615 to an installation temperature can comprise heating the retention ring 615 to an installation temperature which provides approximately 0.08 mm/0.0031" diametrical clearance between the retention ring 615 and the outer surface of the stepped down portion 720 of the bearing bushing surface 610. For example, this may include heating the retention ring 615 to approximately 260° C./500° C. for an Inconel ring used with a Zirconia composite bearing bushing 610. The installation temperature can vary with material, percentage of interference desired, and diameter of the bearing bushing 610, and typically can range between approximately 150° C./300° F. and 350° C./660° F.

In embodiments, selecting and/or providing the bearing bushing 610 can include selecting and/or providing the bearing bushing 610 to have sufficient compressive strength to effectively resist damage from the radially inward force/pressure of the interference fit. Selecting and/or providing the bearing bushing 610 can also comprise providing a cylindrical bearing bushing 610 having: the spring recess 710 extending inward from an outer surface of the bearing bushing 610; the axial slot 715 on the outer surface of the bearing bushing 610 (e.g. extending axially, such as approximately parallel to the longitudinal axis of the bearing bushing), with the axial slot 715 intersecting the spring recess 710; and the stepped portion 720 of the outer surface having a smaller outer diameter than a main body portion 725 of the bearing bushing 610 (e.g. an inward/inset stepped portion), with the stepped portion 720 disposed at an axial end of the bearing bushing 610.

In exemplary method embodiments, before installing the retention ring 615, the anti-rotation tab 605 can be held in place with custom tooling or some other such mechanism such as a metallic hose clip, which may for example hold or clamp the anti-rotation tab 605 and biasing element 705 (e.g. spring) compressed during retention ring 615 installation. After thermally fitting the retention ring 615, the custom tooling can be removed to release the anti-rotation tab 605, allowing an upper surface/top of the anti-rotation tab 605 to press against the retention ring.

In some method embodiments, the bearing bushing 610 can comprise ceramic material, such as a Zirconia compound. By way of example, the bearing bushing 610 can comprise 3% Yttria Stabilized Zirconia. In other embodiments, the bearing bushing 610 can be made from other ceramic material with similar CTE to steel, or from metal (e.g. steel, bronze, etc.).

In some embodiments, the retention ring 615 can comprise steel, such as stainless steel for example, or nickel alloy. In some embodiments, the biasing element 705 can comprise a wave spring, and a bottom of the anti-rotation tab 605 can comprise recesses/insets 810 configured to fit/correspond to the wave spring. In embodiments, the recesses 810 can extend only partially through a height of the tab. In embodiments, the recesses 810 may interact with the spring to fix the axial position of the compression spring (e.g. the wave spring) with respect to the tab and/or to fix the axial position of the tab in the axial slot. For example, the method can further comprise fitting a top of the wave spring into the corresponding recesses/insets 810 in the anti-rotation tab 605. In some embodiments, for example when the biasing element is a linear spring, the retention ring 615 can comprise an inward extension 1220, and the method can further comprise aligning the inward extension 1220 with the axial slot 715 to limit axial movement of the anti-rotation tab 605 within the axial slot 715 (e.g. to block or close the open ends of the axial slot).

Some method embodiments can further include thermally fitting a second retention ring 615 onto a second inwardly stepped portion 720 of the outer surface of the bearing bushing 610 (for example, with the two inwardly stepped portions 720 disposed at opposite axial ends of the bearing bushing 610). Some method embodiments may relate to bearing bushing assemblies 510 configured with a plurality of anti-rotation tabs 605 for engaging the stator. In such method embodiments, prior to thermally fitting a retention ring 615, one or more additional biasing elements 705 can be installed within corresponding additional spring recesses 710, and one or more additional anti-rotation tabs 605 can be installed within corresponding additional axial slots 715 (with each additional axial slot 715 intersecting one of the additional spring recesses 710). For example, the plurality of anti-rotation tabs 605 (and the corresponding axial slots, biasing elements, and spring recesses) can be approximately evenly spaced about the circumference of the bearing bushing 610.

Once the bearing bushing assembly 510 has been assembled, the bearing bushing assembly 510 can be installed onto the rotor and/or slid into a stator, thereby compressing the one or more anti-rotation tab 605; and the bearing bushing assembly 510 can be rotated until the one or more anti-rotation tab 605 aligns with its corresponding slot in an inner surface of the stator, which then automatically inserts the one or more anti-rotation tab 605 within the corresponding slot in the stator in order to engage the bearing bushing assembly 510 within the stator. In embodiments, the bearing bushing assembly 510 may operate at operating temperature when the ESP motor is in use, with operating temperature being above room temperature. In embodiments, the retention ring(s) 615 may still be in interference fit on the stepped portion 720 of the bearing bushing 610 when both the retention ring(s) 615 and the bearing bushing 610 are at operating temperature. For example, the interference fit at operating temperature can be at least about 1 MPa, such as approximately 1-4.8 MPa. The interference fit at operating temperature can depend on the CTE difference between the retention ring 615 and the bearing bushing 610 and/or the amount of interference fit at room temperature. For example, the interference fit at room temperature can be a minimum of about 4.5 MPa (e.g. 650 psi), such as approximately 4.5-8.5 MPa.

Figure 21:
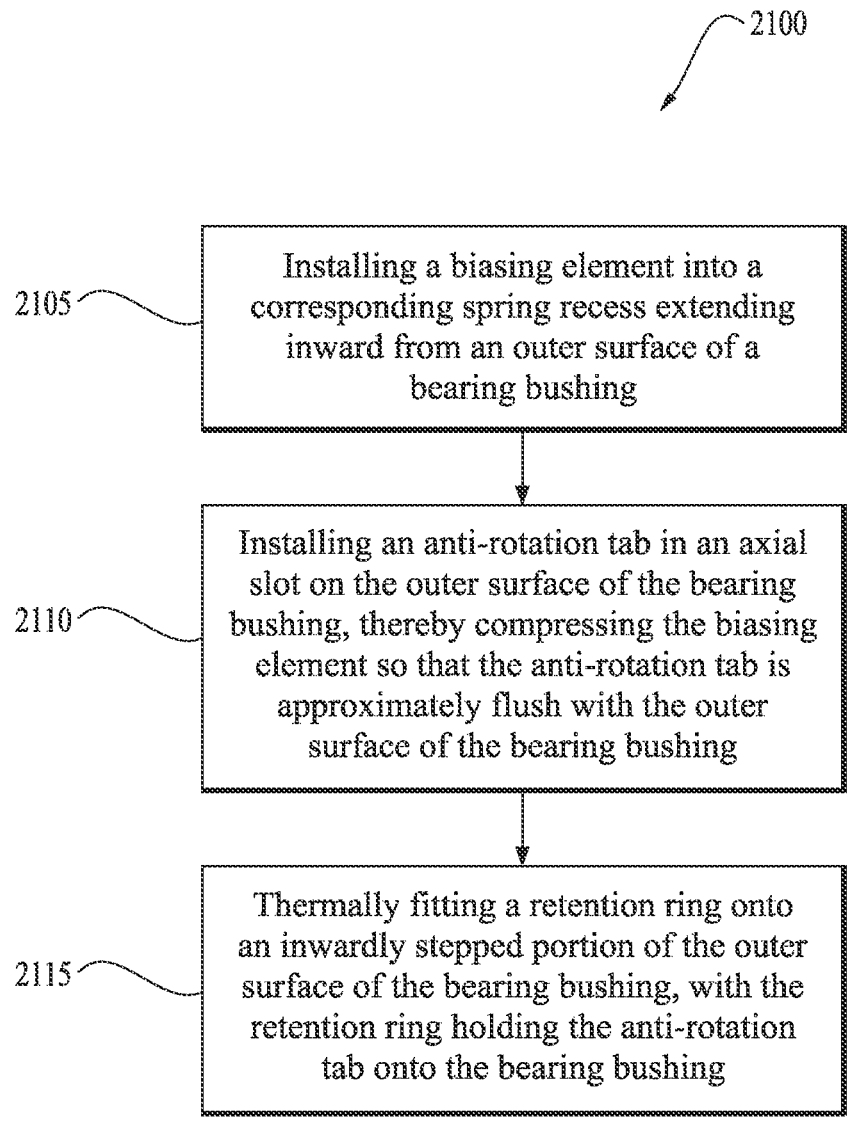
FIG. 21 is a schematic flowchart of an exemplary method for applying a retention ring onto a bearing bushing, according to an embodiment of the disclosure.

An exemplary method embodiment 2100 is shown in FIG. 21 for illustrative purposes.

ADDITIONAL DISCLOSURE

The following are non-limiting, specific embodiments in accordance with the present disclosure:

In a first embodiment, a rotor bearing bushing assembly comprises a substantially cylindrical bearing bushing comprising: a spring recess extending inward from an outer surface of the bearing bushing, an axial slot on the outer surface of the bearing bushing, wherein the axial slot intersects the spring recess, and an inwardly stepped portion of the outer surface; an anti-rotation tab configured to fit and extend axially in the axial slot, the anti-rotation tab being radially slidable within the axial slot; a biasing element configured to fit in the spring recess and to push radially outward on the anti-rotation tab in the axial slot; and a retention ring configured for interference fit on the outer surface of the stepped portion on the outer surface of the bearing bushing: wherein the retention ring overlaps the axial slot and the anti-rotation tab, and the retention ring is a solid ring, spanning a full circumference of the bearing bushing.

A second embodiment can include the rotor bearing bushing assembly of the first embodiment, wherein the stepped portion is located at an axial end of the bearing bushing.

A third embodiment can include the rotor bearing bushing assembly of the first or second embodiments, wherein the retention ring is configured so that: at a room temperature, the retention ring has an inner diameter less than the outer diameter of the stepped portion; at an operating temperature, the retention ring has an inner diameter less than the outer diameter of the stepped portion, so that the retention ring compresses onto the stepped portion for interference fit; and/or at an installation temperature, the retention ring has an inner diameter greater than the outer diameter of the stepped portion, wherein the installation temperature is higher than the operating temperature, the installation temperature depends on the bearing bushing and/or the retention ring material CTE, and/or upon cooling of the retention ring from the installation temperature to the room temperature, the retention ring is interference fit onto the stepped portion.

A fourth embodiment can include the rotor bearing bushing assembly of any one of the first to third embodiments, wherein the CTE of the bearing bushing is similar to the CTE of the retention ring.

A fifth embodiment can include the rotor bearing bushing assembly of any one of the first to fourth embodiments, wherein the bearing bushing comprises a ceramic material.

A sixth embodiment can include the rotor bearing bushing assembly of any one of the first to fifth embodiments, wherein the bearing bushing comprises a Zirconia compound.

A seventh embodiment can include the rotor bearing bushing assembly of any one of the first to sixth embodiments, wherein the anti-rotation tab comprises a nickel alloy.

An eighth embodiment can include the rotor bearing bushing assembly of any one of the first to seventh embodiments, wherein the biasing member is a compression spring, and wherein a bottom of the anti-rotation tab comprises recesses configured to fit the compression spring, with a portion of the bottom of the anti-rotation tab located between the recesses extending into a center of the compression spring.

A ninth embodiment can include the rotor bearing bushing assembly of any one of the first to eighth embodiments, wherein an upper surface of the anti-rotation tab is flat at both axial end portions, slopes upward as extending inward, and has a flat center portion having a height greater than the height of the flat axial end portions.

A tenth embodiment can include the rotor bearing bushing assembly of any one of the first to ninth embodiments, wherein the retention ring further comprises an inward extension configured to align with the axial slot to block an open end of the axial slot.

In an eleventh embodiment, a method for assembling a bearing bushing assembly, comprises installing a biasing element into a corresponding spring recess extending inward from an outer surface of a bearing bushing; installing an anti-rotation tab in an axial slot on the outer surface of the bearing bushing, thereby compressing the biasing element so that the anti-rotation tab is approximately flush with the outer surface of the bearing bushing; and thermally fitting a retention ring onto an inwardly stepped portion of the outer surface of the bearing bushing, wherein the retention ring holds the anti-rotation tab onto the bearing bushing.

A twelfth embodiment can include the method of the eleventh embodiment, wherein thermally fitting a retention ring comprises: heating the retention ring to an installation temperature, sliding the heated retention ring onto the stepped portion of the outer surface of the bearing bushing; and cooling the retaining ring to provide an interference fit securing the retaining ring to the stepped portion of the outer surface of the bearing bushing.

A thirteenth embodiment can include the method of the eleventh or twelfth embodiment, wherein: at a room temperature, the retention ring has an inner diameter less than the outer diameter of the stepped portion; at the operating temperature, the retention ring has an inner diameter less than the outer diameter of the stepped portion, so that the retention ring compresses onto the stepped portion for interference fit; and/or at the installation temperature, the retention ring has an inner diameter greater than the outer diameter of the stepped portion, to allow the retention ring to be slid onto the stepped portion during installation.

A fourteenth embodiment can include the method of any one of the eleventh to the thirteenth embodiments, further comprising providing the retention ring and the bearing bushing, wherein the CTE of the retention ring is similar to the CTE of the bearing bushing.

A fifteenth embodiment can include the method of any one of the eleventh to the fourteenth embodiments, further comprising sizing the inner diameter of the retention ring at room temperature based (at least partially) on CTE difference between the retention ring and the bearing bushing.

A sixteenth embodiment can include the method of any one of the eleventh to the fifteenth embodiments, further comprising sizing the retention ring based (at least partially) on room temperature inner diameter of the retention ring, operating temperature inner diameter of the retention ring, installation temperature inner diameter of the retention ring, room temperature outer diameter of the bearing bushing, operating temperature outer diameter of the bearing bushing, and/or installation temperature outer dimeter of the bearing bushing.

A seventeenth embodiment can include the method of any one of the eleventh to the sixteenth embodiment, further comprising providing the bearing bushing having: the spring recess extending inward from the outer surface of the bearing bushing; the axial slot on the outer surface of the bearing bushing, wherein the axial slot intersects the spring recess; and the inwardly stepped portion of the outer surface, wherein the stepped portion is disposed at an axial end of the bearing bushing.

An eighteenth embodiment can include the method of any one of the eleventh to the seventeenth embodiments, wherein the biasing element comprises a wave spring, and a bottom of the anti-rotation tab comprises recesses configured to fit the wave spring, the method further comprising fitting a top of the wave spring into the corresponding recesses in the anti-rotation tab.

A nineteenth embodiment can include the method of any one of the eleventh to the eighteenth embodiments, wherein the retention ring comprises an inward extension, the method further comprising aligning the inward extension with the axial slot to limit axial movement of the anti-rotation tab within the axial slot.

A twentieth embodiment can include the method of any one of the eleventh to the nineteenth embodiments, further comprising thermally fitting a second retention ring onto a second inwardly stepped portion of the outer surface of the bearing bushing, wherein the two stepped portions are disposed at opposite axial ends of the bearing bushing.

In a twenty-first embodiment, an ESP assembly comprising an electric motor coupled to a pump, and the rotor bearing bushing assembly of any one of the first to tenth embodiments being in the motor.

A twenty-second embodiment can include placement of the ESP assembly of the twenty-first embodiment in a wellbore and operation of same to pump formation fluids from the wellbore to the surface.

While embodiments have been shown and described, modifications thereof can be made by one skilled in the art without departing from the spirit and teachings of this disclosure. The embodiments described herein are exemplary only and are not intended to be limiting. Many variations and modifications of the embodiments disclosed herein are possible and are within the scope of this disclosure. For example, the various elements or components may be combined or integrated in another system or certain features may be omitted or not implemented. Also, techniques, systems, subsystems, and methods described and illustrated in the various embodiments as discrete or separate may be combined or integrated with other techniques, systems, subsystems, or methods without departing from the scope of this disclosure. Other items shown or discussed as directly coupled or connected or communicating with each other may be indirectly coupled, connected, or communicated with. Method or process steps set forth may be performed in a different order. The use of terms, such as "first," "second," "third" or "fourth" to describe various processes or structures is only used as a shorthand reference to such steps/structures and does not necessarily imply that such steps/structures are performed/formed in that ordered sequence (unless such requirement is clearly stated explicitly in the specification).

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent. 2 percent, 3 percent, 4 percent, 5 percent, 50 percent, 51 percent, 52 percent, 95 percent, 96 percent, 97 percent, 98 percent, 99 percent, or 100 percent. Moreover, any numerical range defined by two R numbers as defined in the above is also specifically disclosed. Language of degree used herein, such as "approximately," "about," "generally," and "substantially," represent a value, amount, or characteristic close to the stated value, amount, or characteristic that still performs a desired function or achieves a desired result. For example, the language of degree may mean a range of values as understood by a person of skill or, otherwise, an amount that is +/−10%.

Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded. The use of the terms such as "high-pressure" and "low-pressure" is intended to only be descriptive of the component and their position within the systems disclosed herein. That is, the use of such terms should not be understood to imply that there is a specific operating pressure or pressure rating for such components. For example, the term "high-pressure" describing a manifold should be understood to refer to a manifold that receives pressurized fluid that has been discharged from a pump irrespective of the actual pressure of the fluid as it leaves the pump or enters the manifold. Similarly, the term "low-pressure" describing a manifold should be understood to refer to a manifold that receives fluid and supplies that fluid to the suction side of the pump irrespective of the actual pressure of the fluid within the low-pressure manifold.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

As used herein, the term "and/or" includes any combination of the elements associated with the "and/or" term. Thus, the phrase "A, B, and/or C" includes any of A alone, B alone, C alone, A and B together, B and C together, A and C together, or A, B, and C together.

What is claimed is:

1. A rotor bearing bushing assembly, comprising:
    a substantially cylindrical bearing bushing comprising:
        a spring recess extending inward from an outer surface of the bearing bushing;
        an axial slot on the outer surface of the bearing bushing, wherein the axial slot intersects the spring recess; and
        an inwardly stepped portion of the outer surface;
    an anti-rotation tab configured to fit and extend axially in the axial slot, the anti-rotation tab being radially slidable within the axial slot;
    a biasing element configured to fit in the spring recess and to push radially outward on the anti-rotation tab in the axial slot; and
    a retention ring configured for interference fit on the outer surface of the stepped portion on the outer surface of the bearing bushing;
    wherein:
    the retention ring overlaps the axial slot and the anti-rotation tab; and
    the retention ring is a solid ring, spanning a full circumference of the bearing bushing.

2. The rotor bearing bushing assembly of claim 1, wherein the stepped portion is located at an axial end of the bearing bushing.

3. The rotor bearing bushing assembly of claim 1, wherein the retention ring is configured so that:
    at a room temperature, the retention ring has an inner diameter less than the outer diameter of the stepped portion;
    at an operating temperature, the retention ring has an inner diameter less than the outer diameter of the stepped portion, so that the retention ring compresses onto the stepped portion for interference fit; and
    at an installation temperature, the retention ring has an inner diameter greater than the outer diameter of the stepped portion;
    wherein the installation temperature depends on the bearing bushing and the retention ring material CTE, and upon cooling of the retention ring from the installation temperature to the room temperature, the retention ring is interference fit onto the stepped portion.

4. The rotor bearing bushing assembly of claim 1, wherein the CTE of the bearing bushing is similar to the CTE of the retention ring.

5. The rotor bearing bushing assembly of claim 1, wherein the bearing bushing comprises a ceramic material.

6. The rotor bearing bushing assembly of claim 1, wherein the bearing bushing comprises a Yttria Stabilized Zirconia compound.

7. The rotor bearing bushing assembly of claim 1, wherein the anti-rotation tab comprises a nickel alloy.

8. The rotor bearing bushing assembly of claim 1, wherein the biasing member is a compression spring, and wherein a bottom of the anti-rotation tab comprises recesses configured to fit the compression spring, with a portion of the bottom of the anti-rotation tab located between the recesses extending into a center of the compression spring.

9. The rotor bearing bushing assembly of claim 1, wherein an upper surface of the anti-rotation tab is flat at both axial end portions, slopes upward as extending inward, and has a flat center portion having a height greater than the height of the flat axial end portions.

10. The rotor bearing bushing assembly of claim 1, wherein the retention ring further comprises an inward extension configured to align with the axial slot to block an open end of the axial slot.

11. A method for assembling a bearing bushing assembly, comprising:
    installing a biasing element into a corresponding spring recess extending inward from an outer surface of a bearing bushing;
    installing an anti-rotation tab in an axial slot on the outer surface of the bearing bushing, thereby compressing the biasing element so that the anti-rotation tab is approximately flush with the outer surface of the bearing bushing; and
    thermally fitting a retention ring onto an inwardly stepped portion of the outer surface of the bearing bushing, wherein the retention ring holds the anti-rotation tab onto the bearing bushing.

12. The method of claim 11, wherein thermally fitting a retention ring comprises:
    heating the retention ring to an installation temperature;
    sliding the heated retention ring onto the stepped portion of the outer surface of the bearing bushing; and
    cooling the retaining ring to provide an interference fit securing the retaining ring to the stepped portion of the outer surface of the bearing bushing.

13. The method of claim 12, wherein at a room temperature, the retention ring has an inner diameter less than the outer diameter of the stepped portion; at the operating temperature, the retention ring has an inner diameter less than the outer diameter of the stepped portion, so that the retention ring compresses onto the stepped portion for interference fit; and at the installation temperature, the retention ring has an inner diameter greater than the outer diameter of the stepped portion, to allow the retention ring to be slid onto the stepped portion during installation.

14. The method of claim 13, further comprising providing the retention ring and the bearing bushing, wherein the CTE of the retention ring is similar to the CTE of the bearing bushing.

15. The method of claim 13, further comprising sizing the inner diameter of the retention ring at room temperature based on CTE difference between the retention ring and the bearing bushing.

16. The method of claim 12, further comprising sizing the retention ring based on room temperature inner diameter of the retention ring, operating temperature inner diameter of the retention ring, installation temperature inner diameter of the retention ring, room temperature outer diameter of the bearing bushing, operating temperature outer diameter of the bearing bushing, and installation temperature outer dimeter of the bearing bushing.

17. The method of claim 11, further comprising providing the bearing bushing having:
the spring recess extending inward from the outer surface of the bearing bushing;
the axial slot on the outer surface of the bearing bushing, wherein the axial slot intersects the spring recess; and
the inwardly stepped portion of the outer surface, wherein the stepped portion is disposed at an axial end of the bearing bushing.

18. The method of claim 11, wherein the biasing element comprises a wave spring, and a bottom of the anti-rotation tab comprises recesses configured to fit the wave spring, the method further comprising fitting a top of the wave spring into the corresponding recesses in the anti-rotation tab.

19. The method of claim 11, wherein the retention ring comprises an inward extension, the method further comprising aligning the inward extension with the axial slot to limit axial movement of the anti-rotation tab within the axial slot.

20. The method of claim 11, further comprising thermally fitting a second retention ring onto a second inwardly stepped portion of the outer surface of the bearing bushing, wherein the two stepped portions are disposed at opposite axial ends of the bearing bushing.

* * * * *